(12) United States Patent
Ban et al.

(10) Patent No.: US 8,270,546 B2
(45) Date of Patent: Sep. 18, 2012

(54) RECEPTION STATION, COMMUNICATION SYSTEM AND TRANSMISSION DIVERSITY CONTROL METHOD

(75) Inventors: Yasumitsu Ban, Kawasaki (JP); Akira Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 175 days.

(21) Appl. No.: 12/708,135

(22) Filed: Feb. 18, 2010

(65) Prior Publication Data

US 2010/0142609 A1 Jun. 10, 2010

Related U.S. Application Data

(63) Continuation of application No. PCT/JP2007/066184, filed on Aug. 21, 2007.

(51) Int. Cl.
*H03D 1/04* (2006.01)

(52) U.S. Cl. ........ 375/346; 375/229; 375/230; 375/232; 375/233; 375/260; 375/267; 375/299; 375/340; 375/347; 370/334; 370/335; 370/342; 341/173; 341/180; 329/349; 329/353; 333/18; 333/28 R; 708/300

(58) Field of Classification Search .................. 375/229, 375/230, 232, 233, 260, 267, 299, 340, 346, 375/347; 455/63.1, 67.13, 101, 114.2, 132, 455/296, 500, 501, 562.1; 370/334, 335, 370/342; 341/173, 180; 329/349, 353; 333/18, 333/28 R; 708/300

See application file for complete search history.

(56) References Cited

U.S. PATENT DOCUMENTS

| 6,173,005 B1 | 1/2001 | Kotzin et al. |
|---|---|---|
| 2004/0091026 A1 | 5/2004 | Nakayama |
| 2005/0180493 A1 | 8/2005 | Hooli et al. |

FOREIGN PATENT DOCUMENTS

| EP | 1073212 | 2/2005 |
|---|---|---|
| JP | 8032498 | 2/1996 |
| JP | 2001515295 | 9/2001 |
| JP | 2004153585 | 5/2004 |
| JP | 2004320528 | 11/2004 |
| JP | 2007522752 A | 8/2007 |
| WO | 9959263 | 11/1999 |
| WO | 2005093961 A1 | 10/2005 |

OTHER PUBLICATIONS

3GPP TS 25.211 V7.0.0 (Mar. 2006) 3rd Generation Partnership Project; Technical Specification Group Radio Access Network; Physical channels and mapping of transport channels onto physical channels (FDD) (Release 7) Section 5.3.
3GPP TS 25.101 V7.6.0 (Dec. 2006) 3rd Generation Partnership Project; Technical Specification Group Radio Access Network; User Equipment (UE) radio transmission and reception (FDD) (Release 7) Annex B and Annex A 7.1.6.

(Continued)

*Primary Examiner* — Leon Flores
(74) *Attorney, Agent, or Firm* — Murphy & King, P.C.

(57) ABSTRACT

In a transmission diversity control method in which a request to start or stop transmission diversity is issued by a reception station to a transmission station having a transmission diversity function, the reception station is provided with an equalizer to reduce multipath interference on the basis of a signal correlation, a transmission diversity start request is issued from the reception station to the transmission station when an effect generated by the equalizer is small, and a transmission diversity stop request is issued from the reception station to the transmission station when the effect generated by the equalizer is large.

11 Claims, 17 Drawing Sheets

OTHER PUBLICATIONS

International Search Report dated Nov. 27, 2007, in corresponding International application No. PCT/JP2007/066184.

Japanese Patent Office Action dated Apr. 3, 2012 received in Patent Application No. 2009-528903.
Notification of Reason for Refusal Office Action dated Jun. 19, 2012 received in Japanese Patent Application No. 2009-528903.

FIG. 1

PATH ENVIRONMENT

| ITU Pedestrian A Speed 3km/h (PA3) | | ITU Pedestrian B Speed 3km/h (PB3) | | ITU vehicular A Speed 30km/h (VA30) | | ITU vehicular A Speed 120km/h (VA120) | |
|---|---|---|---|---|---|---|---|
| Relative Delay [ns] | Relative Mean Power [dB] | Relative Delay [ns] | Relative Mean Power [dB] | Relative Delay [ns] | Relative Mean Power [dB] | Relative Delay [ns] | Relative Mean Power [dB] |
| 0 | 0 | 0 | 0 | 0 | 0 | 0 | 0 |
| 110 | -9.7 | 200 | -0.9 | 310 | -1.0 | 310 | -1.0 |
| 190 | -19.2 | 800 | -4.9 | 710 | -9.0 | 710 | -9.0 |
| 410 | -22.8 | 1200 | -8.0 | 1090 | -10.0 | 1090 | -10.0 |
| | | 2300 | -7.8 | 1730 | -15.0 | 1730 | -15.0 |
| | | 3700 | -23.9 | 2510 | -20.0 | 2510 | -20.0 |

21 — PA3; 22 — PB3; 23 — VA30; 24 — VA120

ILLUSTRATIVE VIEW OF STTD DECODER

VIEW OF ANTENNA ARRANGEMENT IN STTD

RECEPTION STATION, COMMUNICATION SYSTEM AND TRANSMISSION DIVERSITY CONTROL METHOD

CROSS REFERENCE TO RELATED APPLICATION

This application is a continuation of PCT application of PCT/JP2007/166184, which was filed on Aug. 21, 2007.

BACKGROUND OF THE INVENTION

The present invention relates to a reception station and a transmission diversity control method, and more particularly to a reception station that issues requests to start and stop transmission diversity to a base station having a transmission diversity function, and communication system and a transmission diversity control method for the reception station.

In a best effort type communication system, communication speed increases as reception performance improves. A transmission diversity control as well as an equalization control is applied for improving the reception performance. The transmission diversity control enables a mobile station to obtain a diversity effect with a single antenna, and includes an open loop mode in which feedback is not required and a closed loop mode requiring feedback.

Open Loop Transmission Diversity System

Space Time Transmit Diversity (STTD) is an open loop mode system in which a set of two encoded symbols are transmitted on respective antennae and a transmission power of each antenna is ½ the normal power (Non-patent Document 1). As shown in FIG. 18, in STTD, an STTD encoder 1 on a transmission side converts two continuous symbol data $[x_0, x_1]$ of a period T into two symbol data sequences. A first data sequence is $[x_0, -x_1^*]$ and a second data sequence is $[x_1, x_0^*]$. As shown in FIG. 19, the two data sequences are transmitted to a reception antenna ATr by two transmission antennae $ATt_0, ATt_1$. Assuming that channel response characteristics between the two transmission antennae $ATt_0, ATt_1$ and the single reception antenna Atr are $h_0, h_1$, antenna reception signals at times t and t+T are $r_0, r_1$, respectively, and noise values are $n_0, n_1$, the antenna reception signals $r_0, r_1$ can be expressed respectively by the following equations.

$$r_0 = h_0 x_0 + h_1 x_1 + n_0$$

$$r_1 = -h_0 x_1^* + h_1 x_0^* + n_1$$

As shown in FIG. 20, an STTD reception unit includes a channel estimation unit 2, an STTD decoder 3, and a decoding unit 4. The channel estimation unit 2 estimates the channel response characteristics $h_0, h_1$ and inputs the estimated characteristics into the STTD decoder 3. The STTD decoder 3 outputs signals $s_0, s_1$ shown respectively in the following equations.

$$s_0 = h_0 r_0 + h_1 r_1^*$$
$$= (|h_0|^2 + |h_1|^2) x_0 + h_0 n_0 + h_1 n_1^*$$
$$s_1 = h_1 r_0 - h_0 r_1^*$$
$$= (|h_0|^2 + |h_1|^2) x_1 + h_1 n_0 - h_0 n_1^*$$

The decoding unit 4 then performs decoding using the output signals from the STTD decoder 3. Note that the values in parentheses in the above equations are STTD gain values.

Closed Loop Transmission Diversity System

FIG. 21 is an illustrative view of a closed loop transmission diversity system. In a closed loop transmission diversity system, a wireless base station of a cellular mobile communication system is provided with a plurality of antenna elements and executes the following operations (1)-(3) repeatedly: (1) different amplitude and phase control is implemented on identical transmission data signals on the basis of feedback information FBI transmitted from a mobile station, (2) a pilot signal is multiplexed with the transmission data subjected to the amplitude and phase control and then transmitted on the plurality of antennae, and (3) the transmission data are received on the mobile station side, whereupon the feedback information (amplitude and phase control amounts) is determined again using a down pilot signal, multiplexed with an up channel signal, and transmitted to the base station side.

As shown in FIG. 21, in closed loop transmission diversity for W-CDMA, which is a third generation mobile communication system, a system employing two transmission antennae is used. In the drawing, orthogonal pilot patterns $P_1, P_2$ are generated in a pilot signal generation unit 11, incorporated into transmission data signal in combiners units $CB_1, CB_2$, and transmitted from transmission antennae 10-1, 10-2, respectively. A channel estimation unit (not shown) on a mobile station reception side estimates channel impulse response vectors $h_1, h_2$ from the respective transmission antennae 10-1, 10-2 of the base station to a mobile station reception antenna 12 by obtaining a correlation between the received pilot signal and a known corresponding pilot pattern.

A weight calculation unit 13 uses the channel estimation values to calculate amplitude and phase control vector (weight vector w, $w=[w_1, w_2]^T$) of the respective transmission antennae 10-1, 10-2 of the base station so that a power P shown in a following Equation (1) reaches a maximum. The calculated vector is then quantized, multiplexed with an up channel signal, and transmitted to the base station side as the feedback information FBI. Note that it is not necessary to transmit both of the values $w_1, w_2$, and when $w_1=1$ is determined, the value $w_2$ may be transmitted alone.

$$P = w^H H^H H w \qquad (1)$$

$$H = [h1, h2] \qquad (2)$$

Here, h1, h2 are the channel impulse response vectors obtained respectively from the antenna 10-1 and the antenna 10-2. Further, the superscript suffixes in $H^H$ and $w^H$ indicate that Hermite conjugates of H and w are taken.

In the mobile station, weight coefficients $w_1, w_2$ (the weight vector w) are calculated by the weighting calculation unit 13 as described above, the weight coefficients $w_1, w_2$ are multiplexed with up transmission data by a multiplexing unit 18 to generate the feedback information FBI, and the feedback information FBI is transmitted to the base station from the transmission antenna 14. In the $3^{rd}$ Generation Partnership Project (3GPP), the FBI information is transmitted to the base station after being mapped on an uplink DPCCH (Dedicated Physical Control Channel).

In the base station, the feedback information from the mobile station is received by a reception antenna 15, a feedback information extraction unit 16 extracts the weight coefficients $w_1, w_2$ serving as control amounts, and an amplitude/phase control unit 17 multiplies down transmission data by the weight coefficients $w_1, w_2$ using multipliers $MP_1, MP_2$ and performs amplitude and phase control on signals to be transmitted from the transmission antennae 10-1, 10-2. As a result, the mobile station can receive signals transmitted from the two diversity transmission antennae 10-1, 10-2 efficiently. Note that ideally, the signals transmitted from the two diversity transmission antennae 10-1, 10-2 reach the reception antenna of the mobile station in phase.

With recent demands for improvements in communication speed, communication devices having as linear equalizers, which achieve an improvement in reception performance by employing a signal correlation to reduce multipath interference, have been developed and are beginning to grow in popularity. Meanwhile, in STTD, which is an open loop transmission diversity mode, a signal correlation is not generated between the transmission antennas, and therefore it is well-known that STTD disturbs an improvement in reception performance achieved by an equalizer. In other words, when STTD is combined with an equalizer, an inter-path correlation value is half of its normal value due to the effect of the STTD, and as a result, the effect of the equalizer is reduced. Therefore, it has been learned by the inventors that when an equalizer is used, the reception performance can be improved by stopping transmission diversity STTD.

Incidentally, depending on the environment, the effect of an equalizer may be large or small. Ideally, the reception performance is improved by stopping transmission diversity in an environment where the effect of the equalizer is large and starting transmission diversity in an environment where the effect of the equalizer is small. Conventionally, however, control to start transmission diversity or stop transmission diversity is not performed during an operation. The reason for this is that with a RAKE system for a conventional communication system employing CDMA, performance deterioration due to the application of transmission diversity does not occur. Thus, a base station employing transmission diversity STTD cannot extract sufficient performance from an equalizer installed in a mobile station.

In a first conventional technique, a reception mode of a mobile station is switched between a TSTD (Time Switched Transmission Diversity) mode and a non-TSTD mode in accordance with a transmission mode of a base station (Patent Document 1). More specifically, a message indicating whether the transmission mode is the TSTD mode or the non-TSTD mode is transmitted from the base station to the mobile station, and upon reception of the message, the mobile station switches the reception mode. A second conventional technique provides a transmission diversity system for realizing a transmission diversity effect even on a transmission path exhibiting large delay dispersion (Patent Document 2). In a third conventional technique, an open loop transmission diversity function and a closed loop transmission diversity function are provided, and these functions are switched in accordance with predetermined conditions (Patent Document 3). In this conventional technique, the closed loop transmission diversity is normally used to eliminate a multipath environment, but when the reliability of a feedback signal decreases due to a high Doppler rate or the like, the multipath environment is eliminated after switching to the open loop transmission diversity.

However, none of these conventional techniques can be used to start and stop transmission diversity control in the base station during an operation in order to extract a sufficient performance from the equalizer installed in the mobile station.

SUMMARY OF THE INVENTION

It is therefore an object of the present invention to switch transmission diversity ON and OFF in a base station during an operation in order to extract a sufficient performance from an equalizer installed in a mobile station. Since a similar object may be envisaged in relation to transmission from the mobile station to the base station, hereinafter a downlink mobile station and an uplink base station will be referred to as a reception station while a downlink base station and an uplink mobile station will be referred to as a transmission station.

Another object of the present invention is to lighten a load on the transmission station by having the reception station issue requests to the transmission station to start and stop transmission diversity control.

A further object of the present invention is to enable the transmission station to consider requests from respective reception stations collectively so that transmission diversity can be started and stopped in relation to all channels at once.

A further object of the present invention is to avoid wasteful use of resources by entrusting the transmission station with a decision to perform the transmission diversity in cases where an SN ratio is small such that an improvement in performance is unlikely to be achieved by switching transmission diversity control ON and OFF.

Patent Document 1: Japanese Patent Application Laid-open No. 2002-515681

Patent Document 2: Japanese Patent Application Laid-open No. H8-32498

Patent Document 3: Japanese Patent Application Laid-open No. 2001-44900

Non-Patent Document 1: 3GPP TS 25.211 5.3 Downlink physical channels

Non-Patent Document 2: 3GPP TS 25.101 Annex B (normative): Propagation conditions Non-Patent Document 3: 3GPP TS 25.101 A.7.1.6

Transmission Diversity Control Method

A first aspect of the present invention is a transmission diversity control method in which a request to start or stop transmission diversity is issued by a reception station to a transmission station having a transmission diversity function, wherein the reception station is provided with an equalizer to reduce multipath interference on the basis of a signal correlation, a transmission diversity start request is issued from the reception station to the transmission station when an effect generated by the equalizer is small, and a transmission diversity stop request is issued from the reception station to the transmission station when the effect generated by the equalizer is large.

In a case where the transmission diversity is realized by an open loop transmission diversity function, the transmission diversity start request is issued in a substantially single-path environment in which the effect generated by the equalizer is assumed to be small, and the transmission diversity stop request is issued in a multipath environment in which the effect generated by the equalizer is assumed to be large.

In a case where the transmission diversity is realized by a closed loop transmission diversity function, when a reliability of a feedback signal transmitted to the transmission station from the reception station during the closed loop transmission diversity is high, then the effect generated by the equalizer is assumed to be small and the transmission diversity start request is issued, and when the reliability of the feedback signal is low, then the effect generated by the equalizer is assumed to be large and the transmission diversity stop request is issued to the transmission station.

Reception Station

A second aspect of the present invention is a reception station that issues a request to start or stop transmission diversity to a transmission station having a transmission diversity function, including: an equalizer for reducing multipath interference on the basis of a signal correlation; an information gathering unit for gathering information required to determine whether an effect generated by the equalizer is large or small; and an information creation unit for creating information requesting the transmission station to start the transmission diversity when the effect generated by the equalizer is small and creating information requesting the transmission station to stop the transmission diversity when the effect generated by the equalizer is large.

In a case where the transmission diversity is realized by an open loop transmission diversity function, the information gathering unit gathers information indicating whether or not the reception station exists in a multipath environment, and the information creation unit creates transmission diversity start request information when the reception station does not exist in a multipath environment and creates transmission diversity stop request information when the reception station exists in a multipath environment.

In a case where the transmission diversity is realized by a closed loop transmission diversity function, the information gathering unit gathers information indicating whether or not a reliability of a feedback signal is high, and the information creation unit creates transmission diversity start request information when the reliability of the feedback signal is high and creates transmission diversity stop request information when the reliability of the feedback signal is low.

Communication System

A third aspect of the present invention is a communication system in which a request to start or stop transmission diversity is issued by a reception station to a transmission station having a transmission diversity function, wherein the reception station includes: an equalizer for reducing multipath interference on the basis of a signal correlation; an information gathering unit for gathering information required to determine whether an effect generated by the equalizer is large or small; and an information creation unit for creating information requesting the transmission station to start the transmission diversity when the effect generated by the equalizer is small and creating information requesting the transmission station to stop the transmission diversity when the effect generated by the equalizer is large, and the transmission station includes: a first transmission unit for transmitting data without performing transmission diversity control; a second transmission unit for transmitting the data after performing the transmission diversity control; and a control unit for performing control on the basis of the request from the reception station so that the data are transmitted without performing the transmission diversity control or transmitted after performing the transmission diversity control.

BRIEF DESCRIPTION OF THE DRAWINGS

FIG. 1 is an illustrative view of various path environments.

Figure 2:
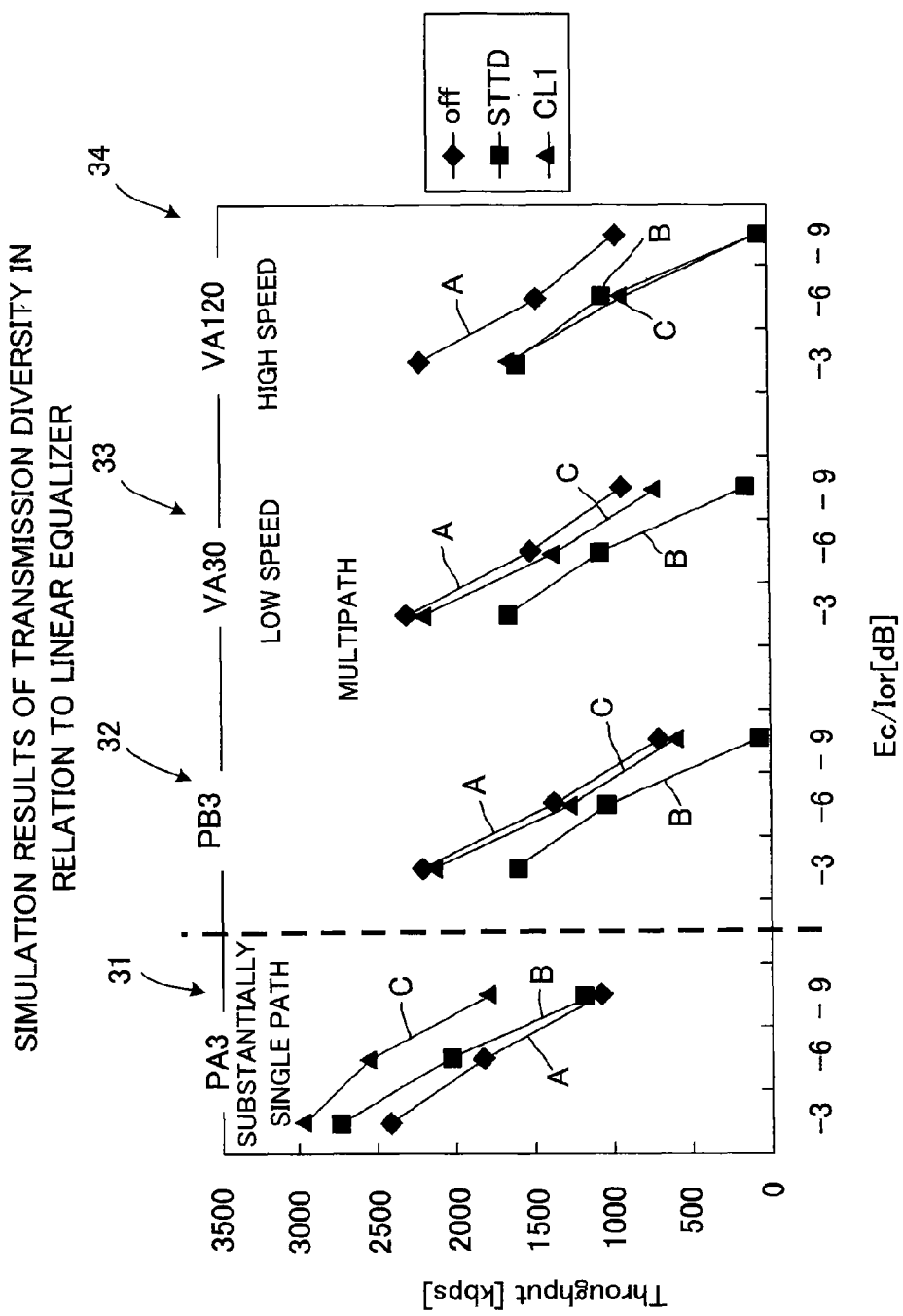
FIG. 2 is an illustrative view of throughput in various path environments when a reception station includes an equalizer.

DESCRIPTION OF THE PREFERRED EMBODIMENTS (A) Principles of the Present Invention A reception station having an equalizer that reduces multipath interference using a signal correlation issues a request to a transmission station having a transmission diversity function to start/stop transmission diversity in relation to a high-speed communication channel allocated to the reception station. More specifically, when the reception station is located in the area of a transmission station that applies transmission diversity, the reception station issues a request to the transmission station to start/stop the transmission diversity on the basis of the reception environment of the reception station. In response to the request, the transmission station starts/stops the transmission diversity, thereby improving the reception performance of all reception stations belonging to the transmission station. Note that instead of issuing a transmission diversity start/stop request, the reception station may transmit, to the transmission station, information required by the transmission station to decide whether to start or stop the transmission diversity so that the transmission station can start or stop the transmission diversity on the basis of the information.

In a case where transmission diversity is realized by an open loop transmission diversity function (STTD function), the effect of the equalizer is small in a substantially single-path environment and large in a multipath environment. Since the transmission diversity disturbs improvements in reception performance through use of the equalizer, in a multipath environment where the equalizer is effective, STTD is switched OFF (the control of STTD stops), while in a substantially single-path environment where the equalizer is not effective, STTD is switched ON (the control of STTD starts).

In a case where transmission diversity is realized by a closed loop transmission diversity function, the reliability of a feedback signal decreases when a Doppler frequency increases during high-speed travel, thereby eliminating the effects of the transmission diversity, but when the Doppler frequency decreases during low-speed travel, the reliability of the feedback signal increases such that the effects of transmission diversity are obtained. Hence, when the Doppler frequency is low, the closed loop transmission diversity is switched ON (the control of the closed loop transmission diversity starts), and when the Doppler frequency is high, the closed loop transmission diversity is switched OFF (the control of the closed loop transmission diversity stops).

Simulation

FIG. 1 shows various path environments described in the Technical Specification of the 3GPP (see Non-patent Document 2). When the throughput of a reception station having an equalizer is measured in a simulation of these various path environments, results shown in FIG. 2 are obtained (see Non-patent Document 3).

In FIG. 1, the path environment is illustrated as a set of a relative delay (ns) and a relative mean power (dB), where 21 is a substantially single-path environment (PA3) relating to a pedestrian A walking at 3 km/h, 22 is a multipath environment (PB3) relating to a pedestrian B walking at 3 km/h, 23 is a multipath environment (VA30) relating to a vehicle A traveling at a vehicle speed of 30 km/h, and 24 is a multipath environment (VA120) relating to a vehicle A traveling at a vehicle speed of 120 km/h.

In FIG. 2, the ordinate shows the throughput (kbps) and the abscissa shows Ec/Ior (dB). Note that Ior is the total power of the transmission station and Ec is the power allocated to each channel. Further, 31 denotes a throughput characteristic in the 3 km/h walking speed substantially single-path environment PA3, 32 denotes a throughput characteristic in the 3 km/h walking speed multipath environment PB3, 33 denotes a throughput characteristic in the low-speed (30 km/h) multipath environment VA30, and 34 denotes a throughput characteristic in the high-speed (120 km/h) multipath environment VA120. In each of PA3, PB3, VA30, VA120, A denotes a throughput characteristic when transmission diversity is OFF, B denotes a throughput characteristic of STTD (open loop transmission diversity), and C denotes a throughput characteristic of closed loop transmission diversity.

Principles of Open Loop Transmission Diversity Control

In FIG. 2, it is evident from the throughput characteristics of the multipath environment PB3 that the performance is poor when STTD is ON but it is improved when STTD is switched OFF. In other words, in a multipath environment, the effect of the equalizer is large, and therefore STTD is preferably switched OFF. In the substantially single-path environment PA3, on the other hand, the performance is better when STTD is ON than when STTD is OFF. In other words, the equalizer is unlikely to have an effect in the substantially single-path path environment PA3.

It can be seen from the above that when transmission diversity is realized by the open loop transmission diversity function (STTD), the equalizer is unlikely to have an effect in a substantially single-path environment, and therefore STTD is preferably switched ON, whereas in a multipath environment, the effect of the equalizer is large, and therefore STTD is preferably switched OFF.

Principles of Closed Loop Transmission Diversity Control

In FIG. 2, it is evident from the throughput characteristics PA3, VA30, VA120 that the performance when closed loop transmission diversity is switched ON is considerably worse during high-speed travel than at walking speed and during low-speed travel. Further, in the walking speed multipath environment PB3, the performance does not change regardless of whether closed loop transmission diversity is ON or OFF, but in the single-path environment PA3, the performance is better when closed loop transmission diversity is ON than when closed loop transmission diversity is OFF. In other words, the equalizer is unlikely to have an effect in the single-path environment PA3.

It can be seen from the above that when the reception station is at low speed, the closed loop transmission diversity is preferably switched ON, and when the reception station is at high speed, the closed loop transmission diversity is preferably switched OFF.

(B) First Embodiment

Figure 3:
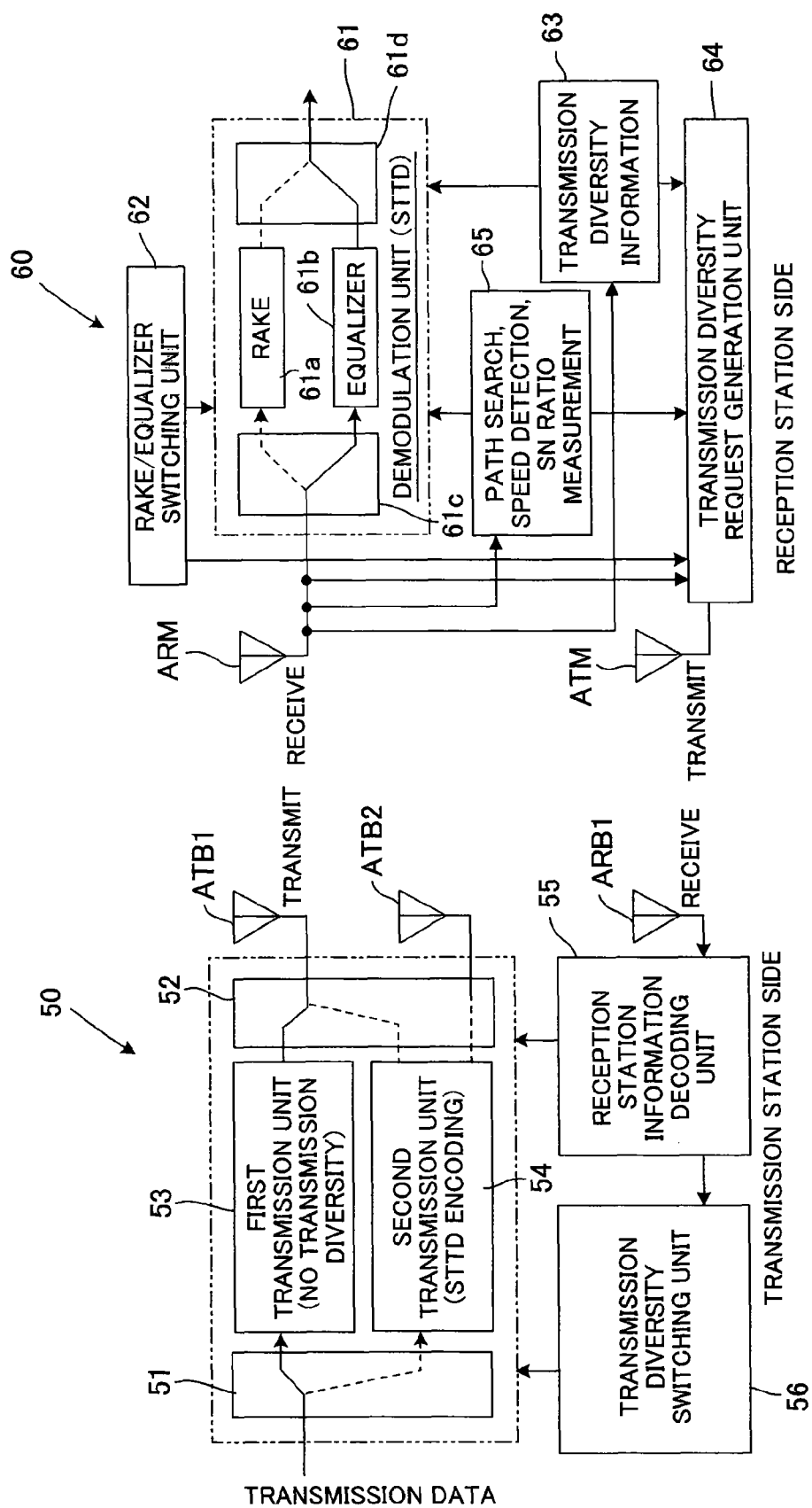
FIG. 3 is a block diagram showing a communication system according to a first embodiment.

FIG. 3 is a block diagram showing a communication system according to a first embodiment, in which 50 denotes a transmission station and 60 denotes a reception station. The transmission station 50 includes an STTD open loop transmission diversity function based on STTD and performs STTD ON/OFF control in accordance with a request from the reception station 60. When STTD is OFF, switches 51, 52 are switched as shown by solid lines in the drawing, whereby transmission data are transmitted from a first transmission antenna ATB1 via a first transmission unit 53 having no transmission diversity function. When STTD is ON, on the other hand, the switches 51, 52 are switched as shown by dotted lines in the drawing, whereby the transmission data are transmitted from first and second transmission antennae ATB1, ATB2 via a second transmission unit 54 including an STTD encoder.

Further, a reception antenna ARB1 receives signals transmitted from respective reception stations, whereupon a reception station information decoding unit 55 decodes reception station information from the antenna reception signals, extracts a transmission diversity change request signal in accordance with the decoding result, inputs the extracted request signal into a transmission diversity switching unit 56, and inputs necessary control information into a transmission unit 52. The transmission diversity switching unit 56 controls the switches 51, 52 on the basis of the transmission diversity change request signal. More specifically, when transmission diversity ON is requested, the transmission diversity switching unit 56 controls the switches 51, 52 so that the transmission data are transmitted from the first and second transmission antennae ATB1, ATB2 via the second transmission unit 54, and when transmission diversity OFF is requested, the transmission diversity switching unit 56 controls the switches 51, 52 so that the transmission data are transmitted from the first transmission antenna ATB1 via the first transmission unit 53.

A demodulation unit 61 of the reception station includes a RAKE demodulator 61a, an equalizer 61b, and switches 61c, 61d. In response to an instruction from a RAKE/equalizer switching unit 62, the switch 61c inputs reception data into one of the RAKE demodulator 61a and the equalizer 61b and the switch 61d inputs a corresponding output into a subsequent-stage decoding unit, not shown in the drawing. The RAKE demodulator 61a performs synchronous demodulation that is channel estimation/compensation at a timing of each path in a multipath environment, combines the demodulation results of the respective paths, and outputs the result of the combination. The channel estimation is performed by calculating a correlation between a received pilot signal and a known pilot signal at the timing of each path. The equalizer 61b performs synchronous demodulation that is channel estimation/compensation at predetermined sampling timings for each path, combines the demodulation results of the respective paths, and outputs the result of the combination. The channel estimation is performed by calculating the correlation between the received pilot signal and the known pilot signal at each sampling timing. Although the RAKE demodulator 61a need only perform the synchronous demodulation at the timing of each path in the multipath environment, the equalizer 61b must perform the synchronous demodulation at the predetermined sampling timings for each path, and therefore the processing amount and power consumption of the equalizer 61b is greater than that of the RAKE demodulator 61a. The RAKE/equalizer switching unit 62 is capable of performing RAKE/equalizer switching in accordance with a user setting or an algorithm of the reception station.

A transmission diversity information unit 63 extracts information indicating whether or not STTD transmission diversity is executed in a transmission station on the basis of a signal received from the transmission station, and inputs this information into the demodulation unit 61 and a transmission diversity request generation unit 64. A measurement unit 65 uses a pilot signal included in the reception signal to conduct a path search, detect a speed (Doppler frequency), measure an SN ratio, and so on, and inputs required measurement data into the demodulation unit 61 and the transmission diversity request generation unit 64. The transmission diversity request generation unit 64 generates the transmission diversity change request signal and transmits the generated signal from a transmission antenna ATM. More specifically, the transmission diversity request generation unit 64 generates a transmission diversity change request signal for requesting that STTD be switched ON or OFF in accordance with:

(1) whether or not the reception station includes an equalizer to demodulate the reception data;
(2) whether or not the reception station exists in a cell of a transmission station which is capable of the STTD transmission diversity; and
(3) whether or not the environment in which the reception station exists is a multipath environment, and transmits the generated transmission diversity change request signal to the transmission station.

Figure 4:
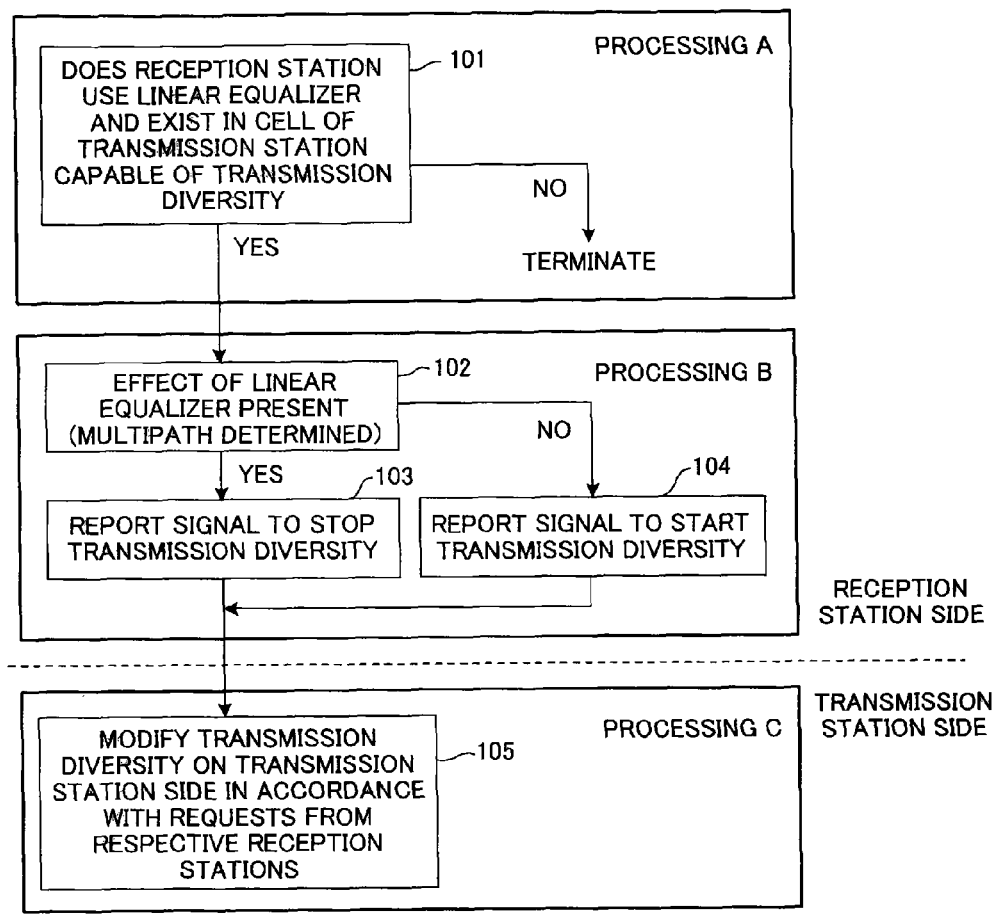
FIG. 4 shows an overall processing flow of transmission diversity control in the communication system of FIG. 3.

FIG. 4 is a flowchart showing an overall processing flow of transmission diversity control in the communication system of FIG. 3.

Checks are performed as to whether or not the reception station 60 uses a linear equalizer for demodulation and whether or not the reception station 60 exists in a cell of a transmission station which is capable of STTD transmission diversity (step 101). When the reception station 60 does not use the equalizer or does not exist in the cell of a transmission station which is capable of STTD transmission diversity, the processing is terminated (Processing A).

When the reception station uses the linear equalizer and exists in the cell of a transmission station which is capable of STTD transmission diversity, a check is performed as to whether or not an effect has been generated by the linear equalizer 61b. In other words, a check is performed as to whether the number of paths found in the path search is substantially single or multiple (step 102). A single path determination is performed based on a value obtained by averaging the determination result of each path in the path search. An average interval of the result for single path determination is approximately several seconds.

Figure 5:
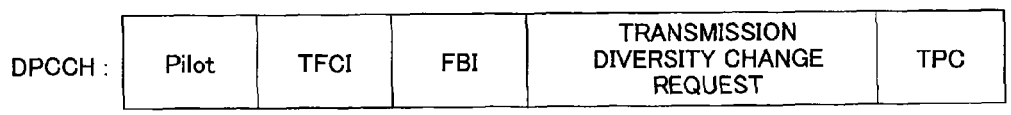
FIG. 5 shows an example of mapping of a transmission diversity change request signal.

When the number of paths is multiple, or in other words when the effect of the linear equalizer 61b is large, a transmission diversity change request signal (report signal) indicating that STTD is to be switched OFF is transmitted to the transmission station (step 103). However, when the number of paths is substantially single, or in other words when the effect of the linear equalizer 61b is small, a transmission diversity change request signal indicating that STTD is to be switched ON is transmitted to the transmission station (step 104). As shown in FIG. 5, the transmission diversity change request signal is mapped on an available region of a dedicated physical control channel DPCCH, for example, and then transmitted to the transmission station (Processing B).

The transmission station 50 performs transmission diversity STTD ON/OFF control in accordance with an instruction from each reception station (step 105) (Processing C).

According to the first embodiment, STTD transmission diversity control is performed in a substantially single-path environment where an equalizer effect does not exist and stopped in a multipath environment where an equalizer effect exists. As a result, a sufficient performance can be extracted from the equalizer installed in the reception station.

Figure 6:
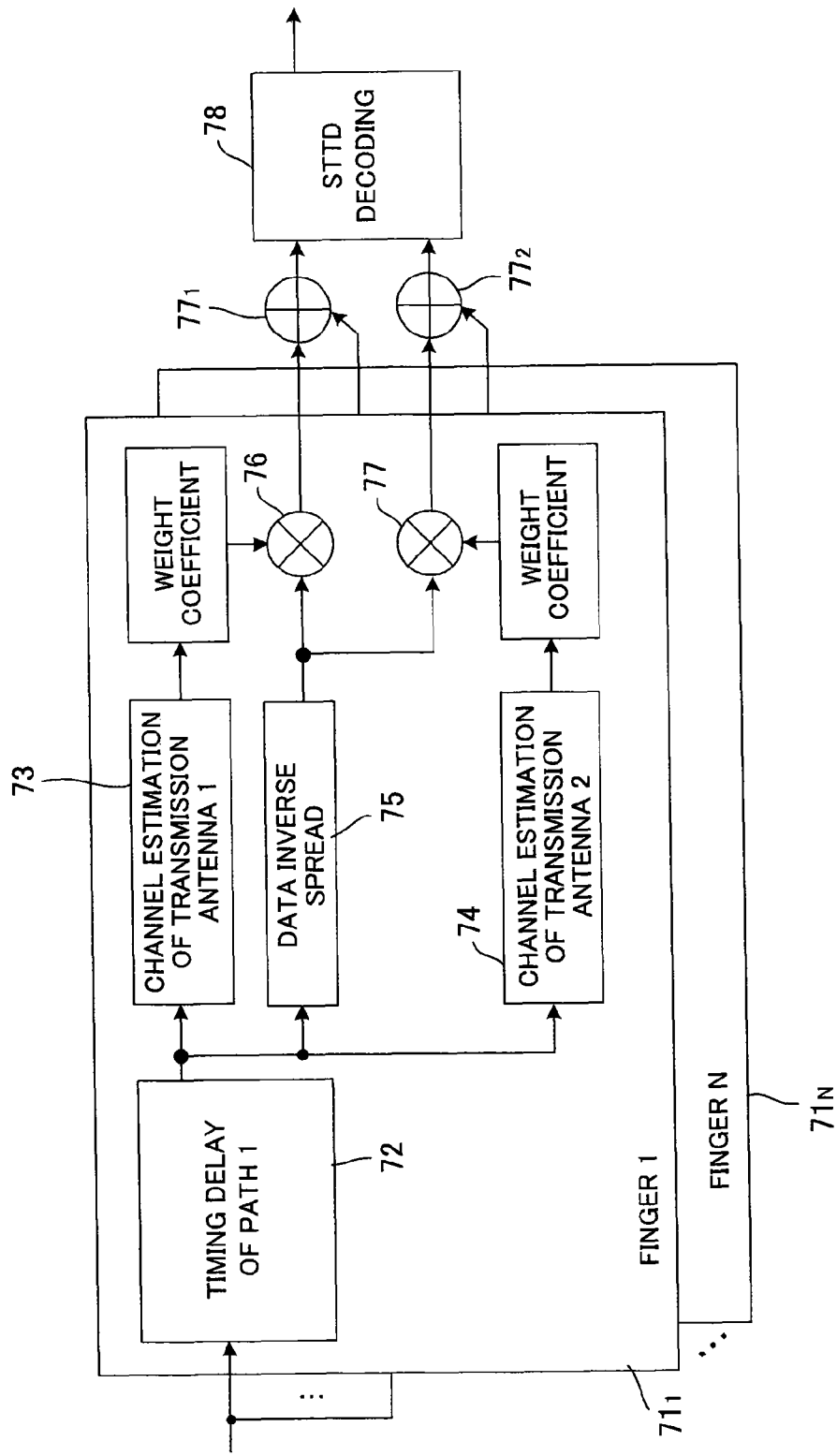
FIG. 6 is a block diagram showing a RAKE demodulator for STTD.

FIG. 6 is a block diagram showing the RAKE demodulator 61a for STTD. Finger units (Fingers 1 to N) $71_1$ to $71_N$ are provided for each path of the multipath environment, and a timing delay unit 72 of each finger unit $71_1$ to $71_N$ delays the input signal in accordance with the delay time of each path of the N paths. A first channel estimation unit 73 of each finger unit $71_1$ to $71_N$ estimates a channel h1 from the first transmission antenna ATB1 to the reception antenna ARM, and a second channel estimation unit 74 estimates a channel h2 from the second transmission antenna ATB2 to the reception antenna ARM. A data inverse spread unit 75 performs inverse spread by multiplying a data signal received via a corresponding path by an inverse spread code. A first channel compensation unit 76 performs channel compensation by multiplying the inverse spread signal by a weight coefficient corresponding to the channel h1, and a second channel compensation unit 77 performs channel compensation by multiplying the inverse spread signal by a weight coefficient corresponding to the channel h2. The respective signals are then output. RAKE synthesis units $77_1$ to $77_2$ respectively combine the output signals of the first and second channel compensation units, which are output by the respective finger units $71_1$ to $71_N$, and input the combined signal into an STTD decoding unit 78. The STTD decoding unit 78 implements STTD decoding processing on the input signal and then inputs the decoding result into a subsequent-stage error correction detection decoding unit, not shown in the drawing.

Figure 7:
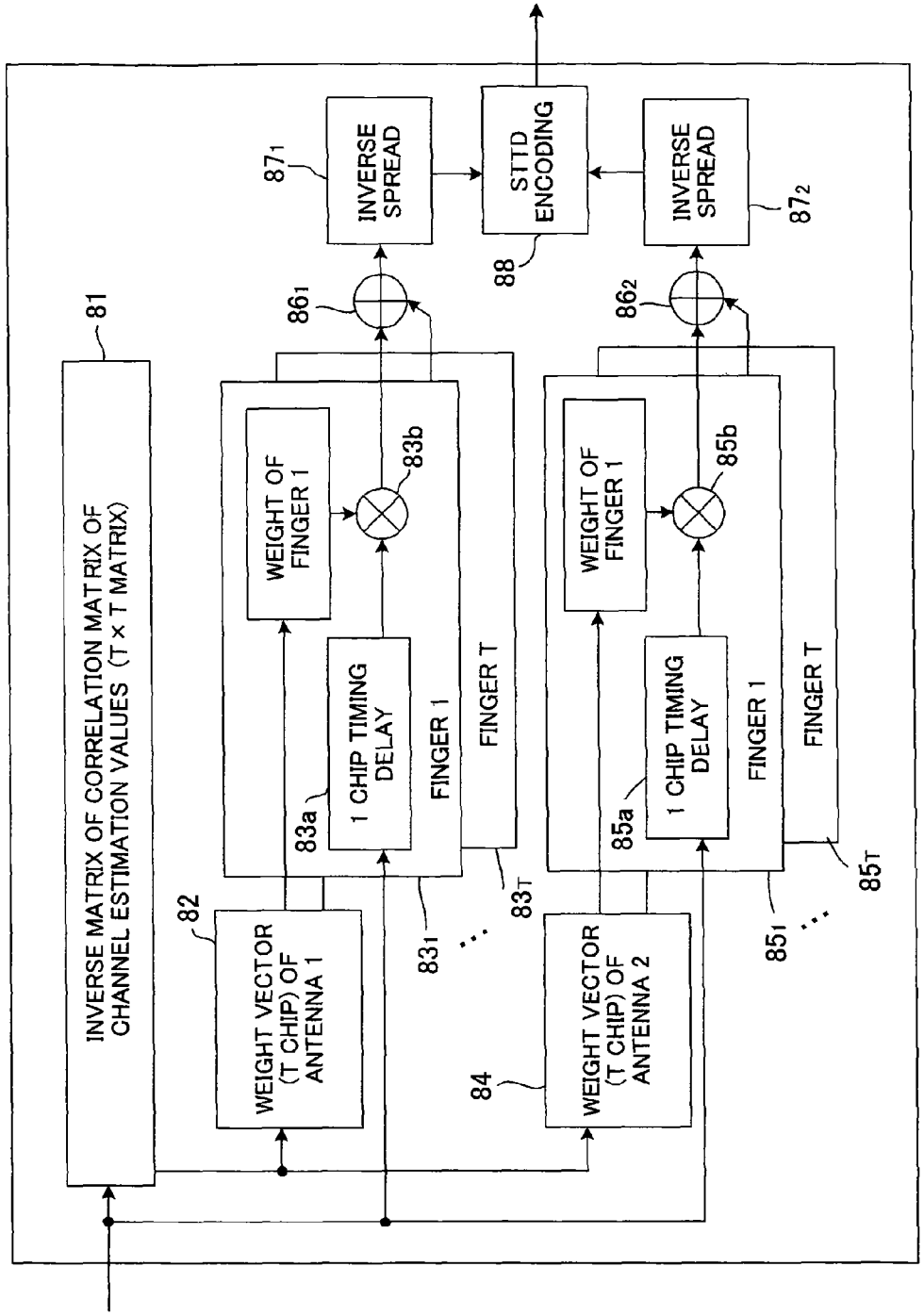
FIG. 7 is a block diagram showing an example of an equalizer for STTD.

FIG. 7 is a block diagram showing an example of the linear equalizer 61b for STTD. An inverse matrix calculation unit 81 for calculating a correlation matrix of channel estimation values calculates a sum of the channel estimation value from the first transmission antenna ATB1 to the reception antenna ARM and the channel estimation value from the second transmission antenna ATB2 to the reception antenna ARM at T sampling timings (T chips), creates a T×T matrix using the correlation values between the sum of ith sampling timing and the sum of ith sampling timing where i=1, 2 . . . , T and j=1, 2 . . . , T calculates an inverse matrix thereof, and then outputs the inverse matrix. A weight vector calculation unit 82 of the first antenna calculates channel compensation weight coefficient of each sampling timing using the inverse matrix determined by the inverse matrix calculation unit 81 and the channel estimation values at the T sampling timings from the first transmission antenna ATB1 to the reception antenna ARM, and inputs the calculated weight coefficients respectively into T finger units $83_1$ to $83_T$ corresponding to the T sampling timings. A timing delay unit 83a of each finger unit $83_1$ to $83_T$ delays an input signal in accordance with a corresponding sampling timing, and a channel compensation unit 83b multiplies the delayed input signal by the channel compensation weight coefficient and then outputs the signal. Note that the linear equalizer is not limited to the constitution shown in FIG. 7, and an equalizer that determines correlations from values other than channel estimation values or an equalizer that performs equalization after inverse spread, for example, may be employed instead.

A weight vector calculation unit 84 of the second antenna calculates channel compensation weight coefficient of each sampling timing using the inverse matrix determined by the inverse matrix calculation unit 81 and the channel estimation values at the T sampling timings from the second transmission antenna ATB2 to the reception antenna ARM, and inputs the calculated weight coefficients respectively into T finger units $85_1$ to $85_T$ corresponding to the T sampling timings. A timing delay unit 85a of each finger unit $85_1$ to $85_T$ delays an input signal in accordance with the corresponding sampling timing, and a channel compensation unit 85b multiplies the delayed input signal by the channel compensation weight coefficient and then outputs the signal. Combiners $86_1$ to $86_2$ respectively combines the signals output by the respective finger units $83_1$ to $83_T$, $85_1$ to $85_T$, thereafter inverse spread units $87_1$ to $87_2$ perform inverse spread by multiplying the respective combined signals by a predetermined spread code and then input the inverse spread results into an STTD decoding unit 88. The STTD decoding unit 88 implements STTD decoding processing on the inverse spread signals and then inputs the decoding result into a subsequent-stage error correction detection decoding unit, not shown in the drawing.

According to the first embodiment, transmission diversity in the transmission station can be started/stopped during an operation, thereby ensuring that a sufficient performance is extracted from the equalizer installed in the reception station. Further, by having the reception station issue a request to the transmission station to start and stop transmission diversity control, the load on the transmission station can be lightened.

(C) Second Embodiment

Figure 8:
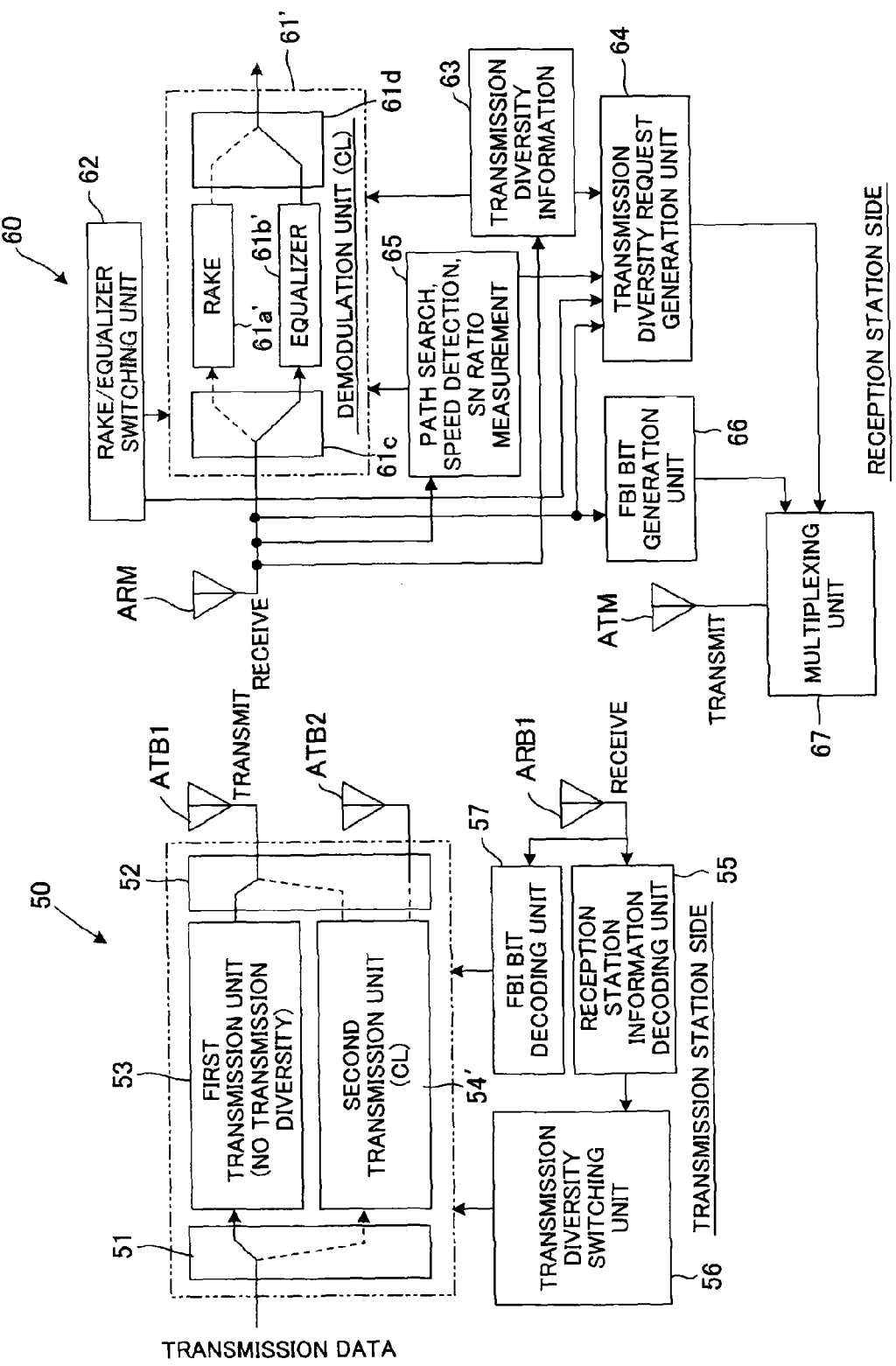
FIG. 8 is a block diagram showing a communication system according to a second embodiment.

FIG. 8 is a block diagram showing a communication system according to a second embodiment, in which identical reference symbols have been allocated to parts that are identical to the first embodiment shown in FIG. 3. The second embodiment differs from the first embodiment in that the transmission station 50 has a closed loop transmission diversity (CL) function and the reception station 60 is capable of performing demodulation control upon reception of a signal transmitted from the transmission station by the closed loop transmission diversity. In the transmission station 50, an FBI bit decoding unit 57 decodes an FBI bit fed back from the reception station 60 via the dedicated physical control channel DPCCH, and inputs an antenna weight indicated by the FBI bit into the second transmission unit 54'. The second transmission unit 54' multiplies the transmission data by the antenna weight and transmits the multiplication result to the reception station via the first and second transmission antennae ATB1, ATB2. Meanwhile, a demodulation unit 61' of the reception station 60 includes a RAKE demodulator 61a' for the closed loop transmission diversity and an equalizer 61b' for the closed loop transmission diversity, and an FBI bit generation unit 66 generates feedback information FBI by calculating an antenna weight. A multiplexing unit 67 maps the FBI information on the DPCCH channel together with a transmission diversity change request signal, and then transmits the FBI information and transmission diversity change request signal to the transmission station 50 from the transmission antenna ATM.

When CL is OFF, the switches 51, 52 are switched as shown by solid lines in the drawing, whereby the transmission data are transmitted from the first transmission antenna ATB1 via the first transmission unit 53 having no transmission diversity function. When CL is ON, on the other hand, the switches 51, 52 are switched as shown by dotted lines in the drawing, whereby the transmission data are transmitted from the first and second transmission antennae ATB1, ATB2 via the second transmission unit 54', which performs closed loop transmission diversity control (CL) on the transmission data.

Further, the reception antenna ARB1 receives a signal transmitted from the respective reception stations, whereupon the reception station information decoding unit 55 decodes reception station information from the antenna reception signal, extracts the transmission diversity change request signal in accordance with the decoding result, and inputs the extracted request signal into the transmission diversity switching unit 56. The FBI bit decoding unit 57 decodes the dedicated control channel DPCCH from the antenna reception signal, extracts the FBI bit included in the decoding result, and inputs the antenna weight indicated by the FBI bit into the second transmission unit 54'.

The transmission diversity switching unit 56 controls the switches 51, 52 on the basis of the transmission diversity change request signal. More specifically, when transmission diversity ON is requested, the transmission diversity switching unit 56 controls the switches 51, 52 so that the transmission data are transmitted from the first and second transmission antennae ATB1, ATB2 via the second transmission unit 54', and when transmission diversity OFF is requested, the transmission diversity switching unit 56 controls the switches 51, 52 so that the transmission data are transmitted from the first transmission antenna ATB1 via the first transmission unit 53. When transmission diversity ON is requested, the second transmission unit 54' multiplies the transmission data by the antenna weight input from the FBI bit decoding unit 57 and transmits the multiplication result to the reception station via the first and second transmission antennae ATB1, ATB2.

The closed loop transmission diversity demodulation unit 61' of the reception station includes the RAKE demodulator 61a', the linear equalizer 61b', and the switches 61c, 61d. In response to an instruction from the RAKE/equalizer switching unit 62, the switch 61c inputs reception data into one of the RAKE demodulator 61a' and the linear equalizer 61b' and the switch 61d inputs a corresponding output into a subsequent-stage decoding unit, not shown in the drawing. The RAKE demodulator 61a' performs synchronous demodulation that is channel estimation/compensation at a timing of each path in the multipath environment, combines the demodulation results of the respective paths, and outputs the result of the combination. The equalizer 61b' performs synchronous demodulation that is channel estimation/compensation at predetermined sampling timings for each path, combines the demodulation results of the respective paths, and outputs the result of the combination. The RAKE/equalizer switching unit 62 is capable of performing RAKE/equalizer switching in accordance with a user setting or an algorithm of the reception station.

The transmission diversity information unit 63 extracts information indicating whether or not closed loop transmission diversity (CL) is executed in a transmission station on the basis of a signal received from the transmission station, and inputs this information into the demodulation unit 61' and the transmission diversity request generation unit 64. The measurement unit 65 uses the pilot signal included in the reception signal to conduct a path search, detect the speed (Doppler frequency), measure the SN ratio, and so on, and inputs the required measurement data into the demodulation unit 61 and the transmission diversity request generation unit 64. The transmission diversity request generation unit 64 generates a transmission diversity change request signal and transmits the generated signal from the transmission antenna ATM. More specifically, the transmission diversity request generation unit 64 inputs a transmission diversity change request signal for requesting that CL be switched ON or OFF into the multiplexing unit 67 in accordance with:

(1) whether or not the reception station includes an equalizer to demodulate the reception data;

(2) whether or not the reception station exists in a cell of a transmission station which is capable of the closed loop transmission diversity CL; and (3) whether the speed of the reception station is high or low.

The FBI bit generation unit 66 generates the feedback information FBI by calculating the antenna weight, and inputs the generated information into the multiplexing unit 67. The multiplexing unit 67 maps the FBI information on the DPCCH channel together with the transmission diversity change request signal, and transmits the FBI information and transmission diversity change request signal to the transmission station 50 from the transmission antenna ATM.

Figure 9:
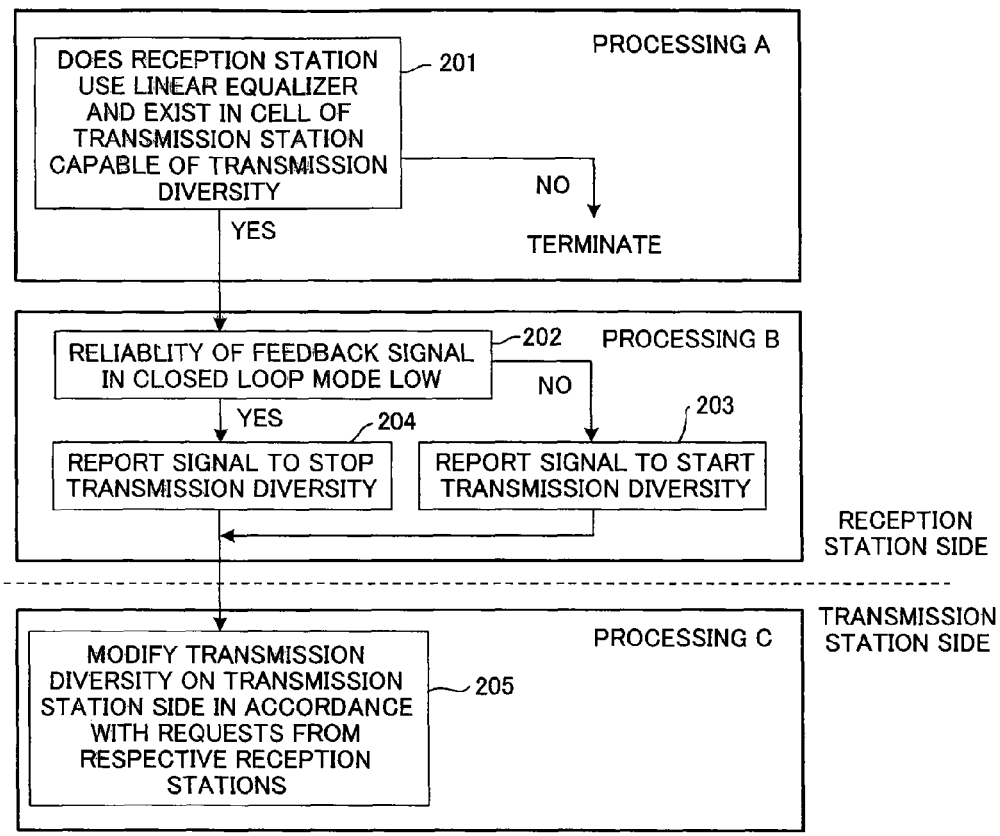
FIG. 9 shows an overall processing flow of transmission diversity control in the communication system of FIG. 8.

FIG. 9 is a flowchart showing an overall processing flow of transmission diversity control in the communication system of FIG. 8.

Checks are performed as to whether or not the reception station 60 is uses the linear equalizer for demodulation and whether or not the reception station 60 exists in a cell of a transmission station which is capable of closed loop transmission diversity CL (step 201). When the reception station 60 does not use the equalizer or does not exist in the cell of a transmission station which is capable of CL transmission diversity, the processing is terminated (Processing A).

When the reception station uses the linear equalizer and exists in the cell of a transmission station which is capable of CL transmission diversity, a check is performed as to whether or not the reliability of a feedback signal of the closed loop transmission diversity is low, or in other words whether or not the speed of the reception station is high (step 202). When the speed of the reception station is low, a transmission diversity change request signal (report signal) indicating that CL is to be switched ON is transmitted to the transmission station (step 203). However, when the speed of the reception station is high, a transmission diversity change request signal indicating that CL is to be switched OFF is transmitted to the transmission station (step 204) (Processing B).

The transmission station 50 performs the closed loop transmission diversity CL ON/OFF control in accordance with an instruction from each reception station (step 205) (Processing C).

According to the second embodiment, the closed loop transmission diversity CL is implemented when the speed of the reception station is low such that an equalizer effect does not generate, and stopped when the speed of the reception station is high such that an equalizer effect generates. As a result, a sufficient performance can be extracted from the equalizer installed in the reception station.

Figure 10:
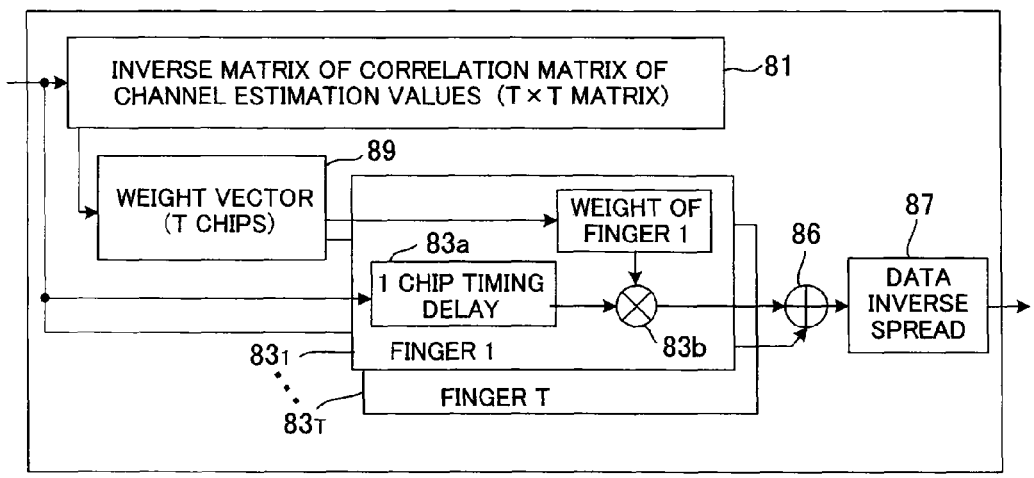
FIG. 10 is a block diagram showing an equalizer for closed loop transmission diversity.

FIG. 10 is a block diagram showing an example of the linear equalizer 61b' for closed loop transmission diversity. The inverse matrix calculation unit 81 for calculating a correlation matrix of channel estimation values calculates a sum of the channel estimation value from the first transmission antenna ATB1 to the reception antenna ARM and the channel estimation value from the second transmission antenna ATB2 to the reception antenna ARM at T sampling timings, creates a T×T matrix using the correlation values between the sum of ith sampling timing and the sum of jth sampling timing where i=1, 2, . . . T and j=1, 2, . . . T, calculates an inverse matrix thereof, and then outputs the inverse matrix. A weight vector calculation unit 89 calculates channel compensation weight coefficient of each sampling timing using the inverse matrix determined by the inverse matrix calculation unit 81 and the sum of the channel estimation values at the T sampling timings, and inputs the calculated weight coefficients respectively into the T finger units $83_1$ to $83_T$ corresponding to the T sampling timings. The timing delay unit 83a of each finger unit $83_1$ to $83_T$ delays an input signal in accordance with a corresponding sampling timing, and the channel compensation unit 83b multiplies the delayed input signal by a channel compensation weight coefficient and then outputs the signal. A combiner 86 combines the signals output by the respective finger units $83_1$ to $83_T$, thereafter an inverse spread unit 87 performs inverse spread by multiplying the combined signal by a predetermined spread code and then inputs the inverse spread result into a subsequent-stage error correction detection decoding unit, not shown in the drawing. Note that the linear equalizer is not limited to the constitution shown in FIG. 9, and an equalizer that determines correlations from values other than channel estimation values or an equalizer that performs equalization after inverse spread, for example, may be employed instead.

Figure 11:
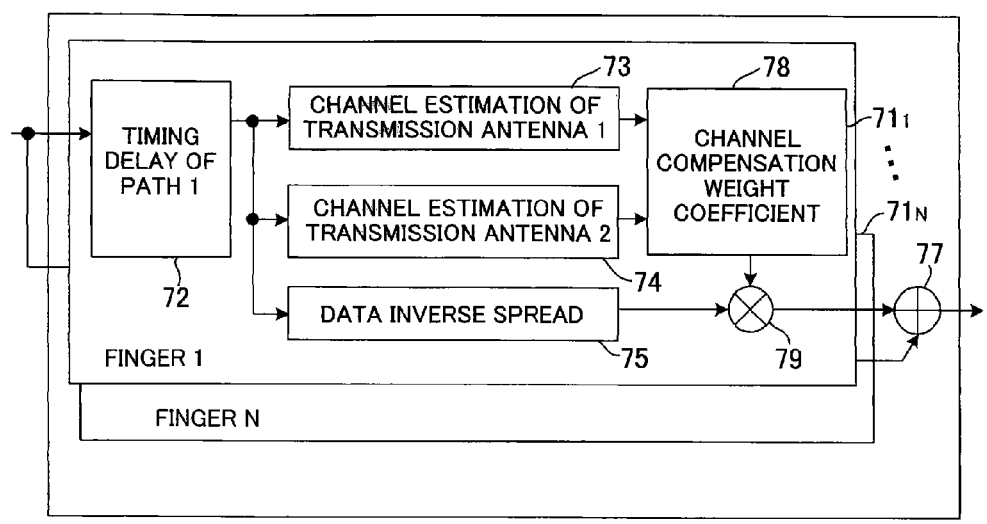
FIG. 11 is a block diagram showing an example of a RAKE demodulator for closed loop transmission diversity.

FIG. 11 is a block diagram showing the RAKE demodulator 61a' for the closed loop transmission diversity. The finger units (Fingers 1 to N) $71_1$ to $71_N$ are provided for each path of the multipath environment, and the timing delay unit 72 of each finger unit $71_1$ to $71_N$ delays the input signal in accordance with the delay time of each path of the N paths. The first channel estimation unit 73 of each finger unit $71_1$ to $71_N$ estimates the channel h1 from the first transmission antenna ATB1 to the reception antenna ARM, and the second channel estimation unit 74 estimates the channel h2 from the second transmission antenna ATB2 to the reception antenna ARM. The data inverse spread unit 75 performs inverse spread by multiplying code by a data signal received via the corresponding path by an inverse spread. A channel compensation weight coefficient calculation unit 78 calculates a channel compensation weight coefficient by multiplying the antenna weights of the first and second transmission antennas by the channels h1, h2, respectively, and adding the results together. A channel compensation unit 79 performs channel compensation by multiplying the inverse spread signal by the weight coefficient, and then outputs the result. A RAKE combiner 77 combines the output signal of the channel compensation unit 79 output by each of the finger units $71_1$ to $71_N$ and inputs the combined signal into a subsequent-stage error correction detection decoding unit, not shown in the drawing.

(D) Third Embodiment

Figure 12:
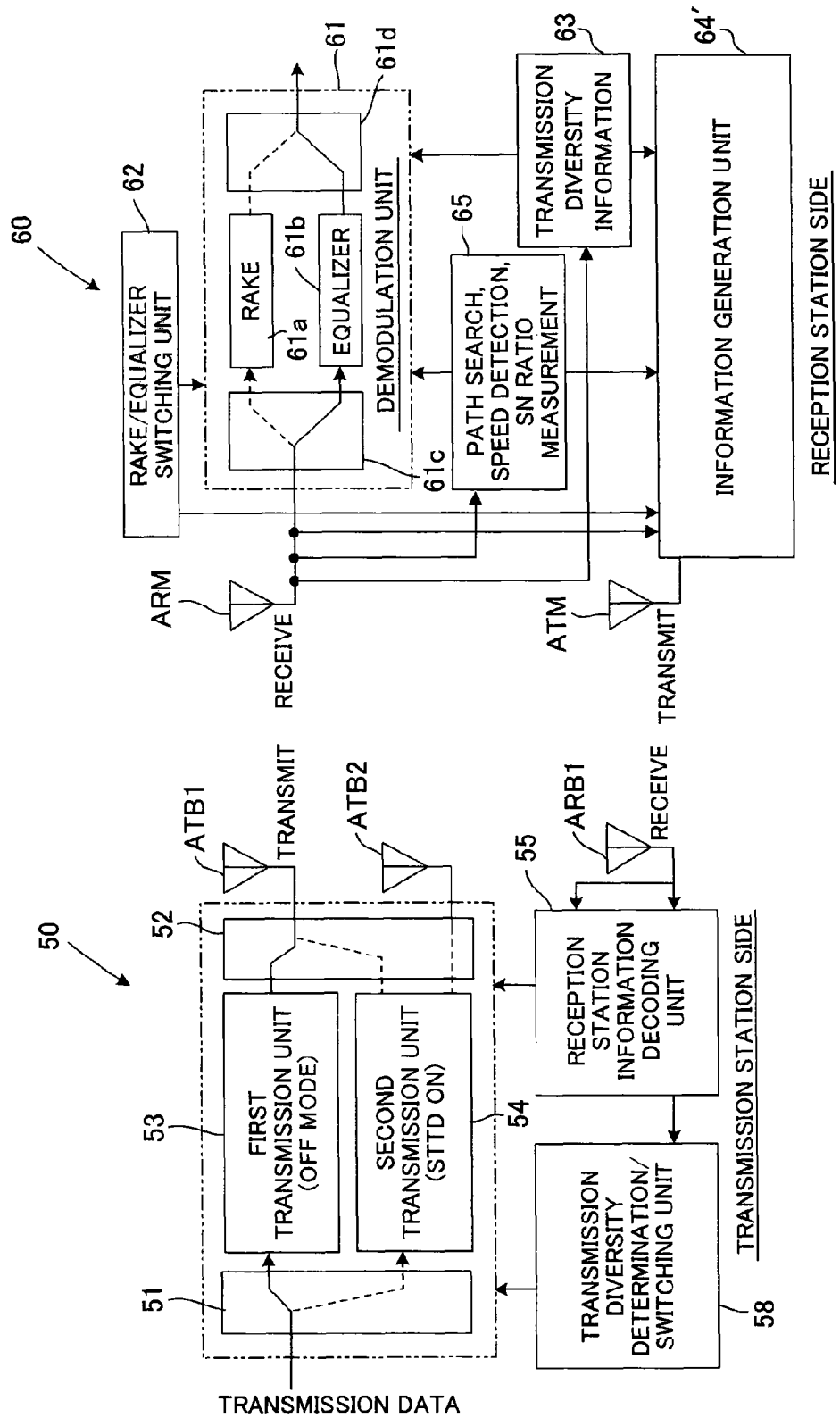
FIG. 12 is a block diagram showing a communication system according to a third embodiment.

FIG. 12 is a block diagram showing an example of a communication system according to a third embodiment, in which the transmission station, rather than the reception station, decides whether to switch transmission diversity ON or OFF. Identical reference symbols have been allocated to identical parts to the communication system of the first embodiment, shown in FIG. 3. The third embodiment differs from the first embodiment in that an information generation unit 64' creates information required for the transmission diversity ON/OFF decision and transmits the generated information to the transmission station, and a transmission diversity determination/switching unit 58 decides whether to switch transmission diversity ON or OFF by referring to the information and controls the switches 51, 52 accordingly. When the transmission diversity is open loop transmission diversity, the information required for the transmission diversity ON/OFF decision is generated in accordance with the number of paths of the multipath environment.

Figure 13:
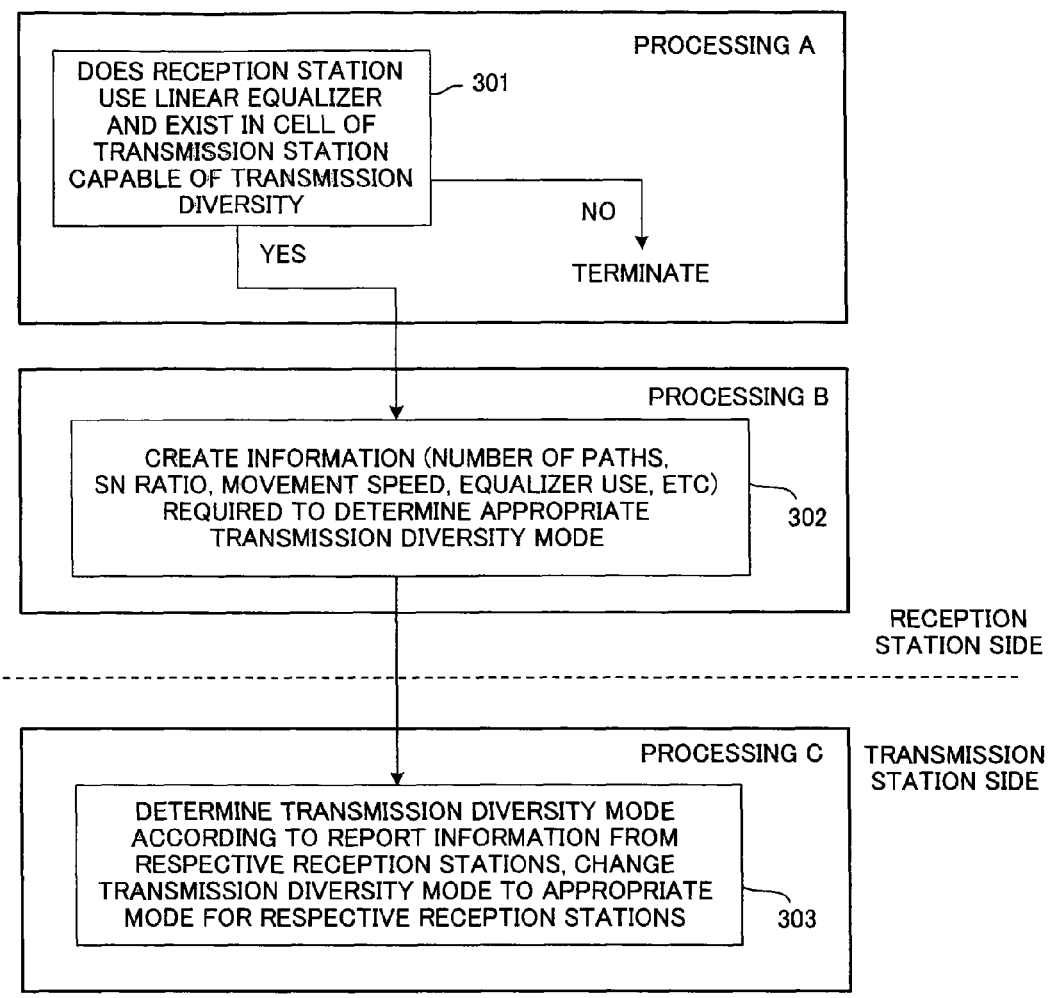
FIG. 13 shows an overall processing flow of the communication system according to the third embodiment.

FIG. 13 is a flowchart showing an overall processing flow of the communication system according to the third embodiment.

Checks are performed as to whether or not the reception station 60 is uses the equalizer for demodulation and whether or not the reception station 60 exists in a cell of a transmission station which is capable of open loop transmission diversity (step 301). When the reception station 60 does not use the equalizer or does not exist in the cell of a transmission station which is capable of STTD transmission diversity, the processing is terminated (Processing A).

When the reception station uses the linear equalizer and exists in the cell of a transmission station which is capable of STTD transmission diversity, information regarding the number of paths obtained in the path search, use of the equalizer, and so on is created and transmitted to the transmission station 50 (step 302, Processing B).

Having received the information required for the transmission diversity ON/OFF decision, the transmission station 50 decides whether to switch STTD ON or OFF by referring to the information, and controls the switches 51, 52 accordingly (step 303, Processing C).

A case in which the transmission station performs STTD transmission diversity was described above, but similar control may be performed when the transmission station performs closed loop transmission diversity CL. In this case, the information required in the transmission diversity ON/OFF decision includes the reception station speed, the Doppler frequency, and so on. The information generation unit 64' creates and transmits this information, and also creates and transmits the FBI information required to control the closed loop transmission diversity.

(E) Fourth Embodiment

Figure 14:
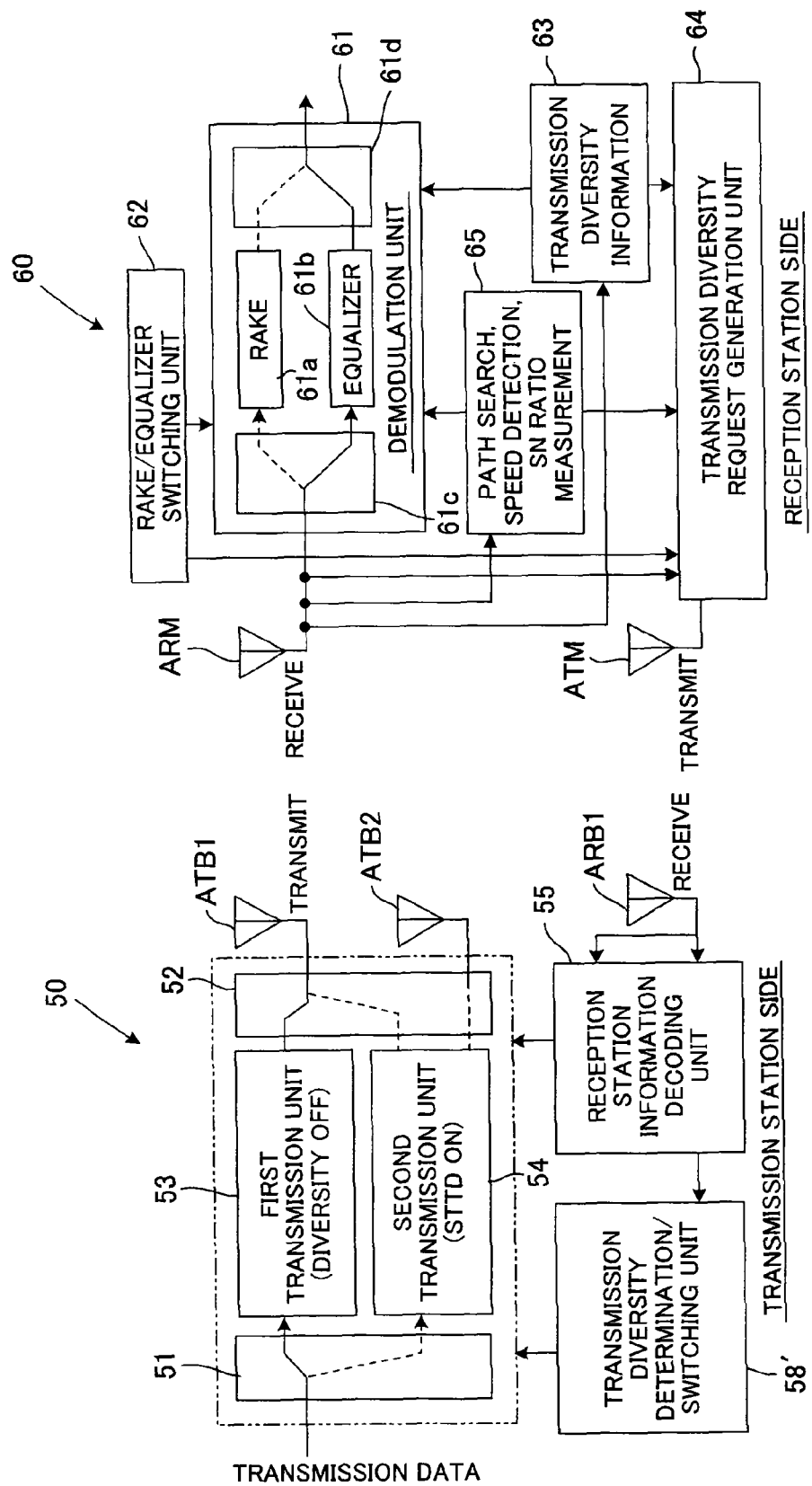
FIG. 14 is a block diagram showing a communication system according to a fourth embodiment.

FIG. 14 is a block diagram showing an example of a communication system according to a fourth embodiment, in which the decision to change the transmission diversity mode is performed on the transmission station side rather than the reception station side and transmission diversity is started and stopped in relation to all channels (reception stations) at once. Identical reference symbols have been allocated to identical parts to the communication system of the first embodiment, shown in FIG. 3. The fourth embodiment differs from the first embodiment in that a transmission diversity determination/switching unit 58' acquires a number of reception stations requesting that STTD be switched ON, a communication quality (CQI) of the reception stations, and so on collectively, and starts or stops transmission diversity in relation to all channels at once. When transmission diversity is OFF in all channels, the precision of the correlation calculated by the equalizer improves, and therefore a further improvement in reception performance can be expected.

Figure 15:
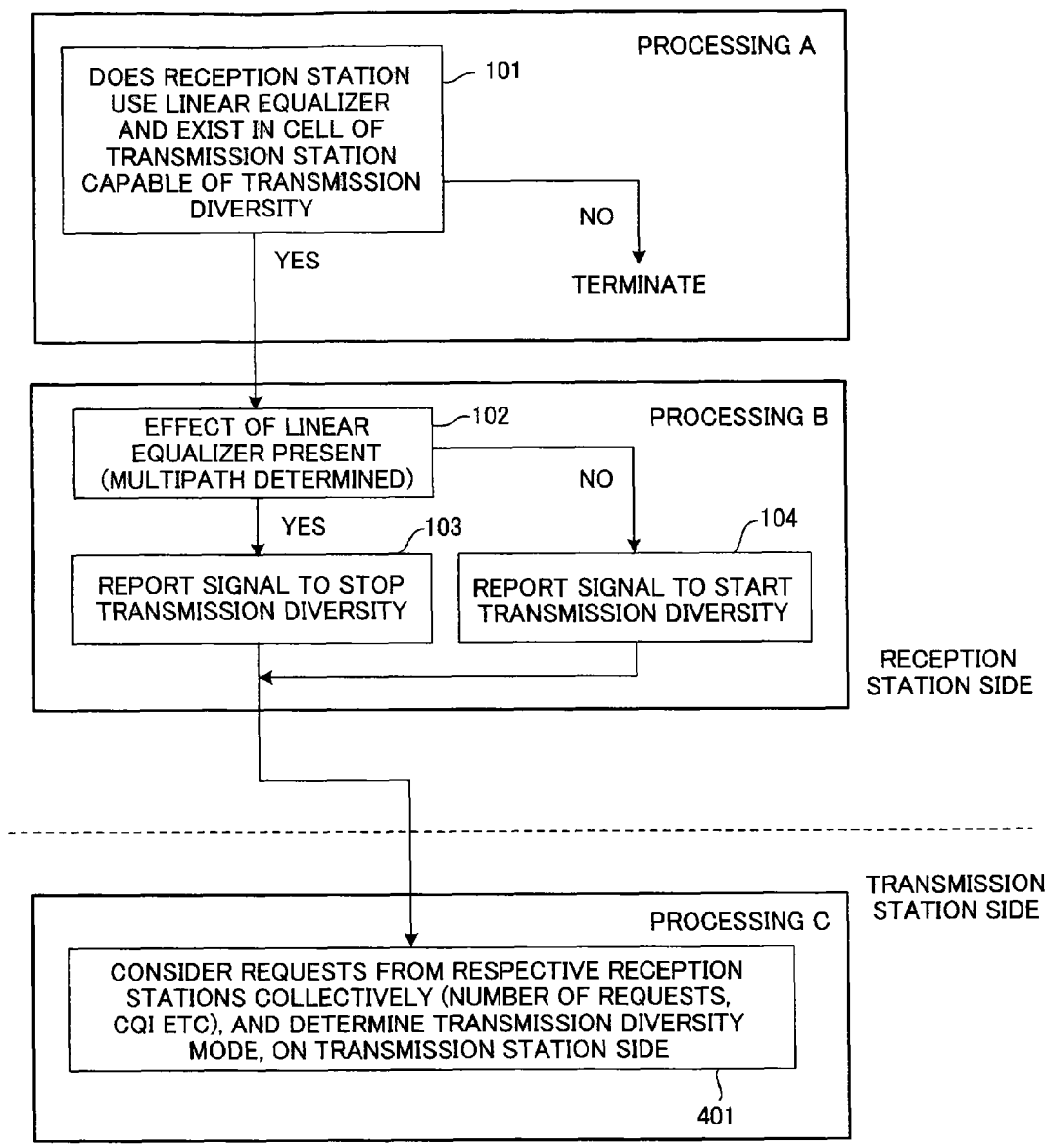
FIG. 15 shows an overall processing flow of the communication system according to the fourth embodiment.

FIG. 15 is a flowchart showing an overall processing flow of the communication system according to the fourth embodiment, in which Processing A and B is identical to that of the first embodiment shown in FIG. 4. Checks are performed as to whether or not the reception station 60 uses an equalizer for demodulation and whether or not the reception station 60 exists in a cell of a transmission station which is capable of STTD transmission diversity (step 101). When the reception station 60 does not use an equalizer or does not exist in the cell of a transmission station which is capable of STTD transmission diversity, the processing is terminated.

When the reception station uses the linear equalizer and exists in the cell of a transmission station which is capable of STTD transmission diversity, a check is performed as to whether or not an effect has been generated by the linear equalizer 61b. In other words, a check is performed as to whether the number of paths found in the path search is substantially single or multiple (step 102).

When the number of paths is multiple, or in other words when the effect of the linear equalizer 61b is large, a transmission diversity change request signal (report signal) indicating that STTD is to be switched OFF is transmitted to the transmission station (step 103). However, when the number of paths is substantially single, or in other words when the effect of the linear equalizer 61b is small, a transmission diversity change request signal indicating that STTD is to be switched ON is transmitted to the transmission station (step 104).

The transmission station 50 receives the transmission diversity change request signal from the respective reception stations, and when the number of reception stations requesting that STTD be switched ON is larger than a set value, the transmission station 50 starts transmission diversity in all channels at once. Conversely, when the number of reception stations requesting that STTD be switched OFF is larger than the set value, the transmission station 50 stops transmission diversity in all channels at once (step 401, Processing C). When transmission diversity is OFF in all channels, the precision of the correlation utilized by the equalizer improves, and therefore a further improvement in reception performance can be expected.

A case in which the transmission station performs STTD transmission diversity was described above, but similar control may be performed when the transmission station performs closed loop transmission diversity CL. In this case, the transmission diversity request generation unit 64 creates and transmits a transmission diversity change request signal and the FBI bit information required for closed loop transmission diversity control.

(G) Fifth Embodiment

Figure 16:
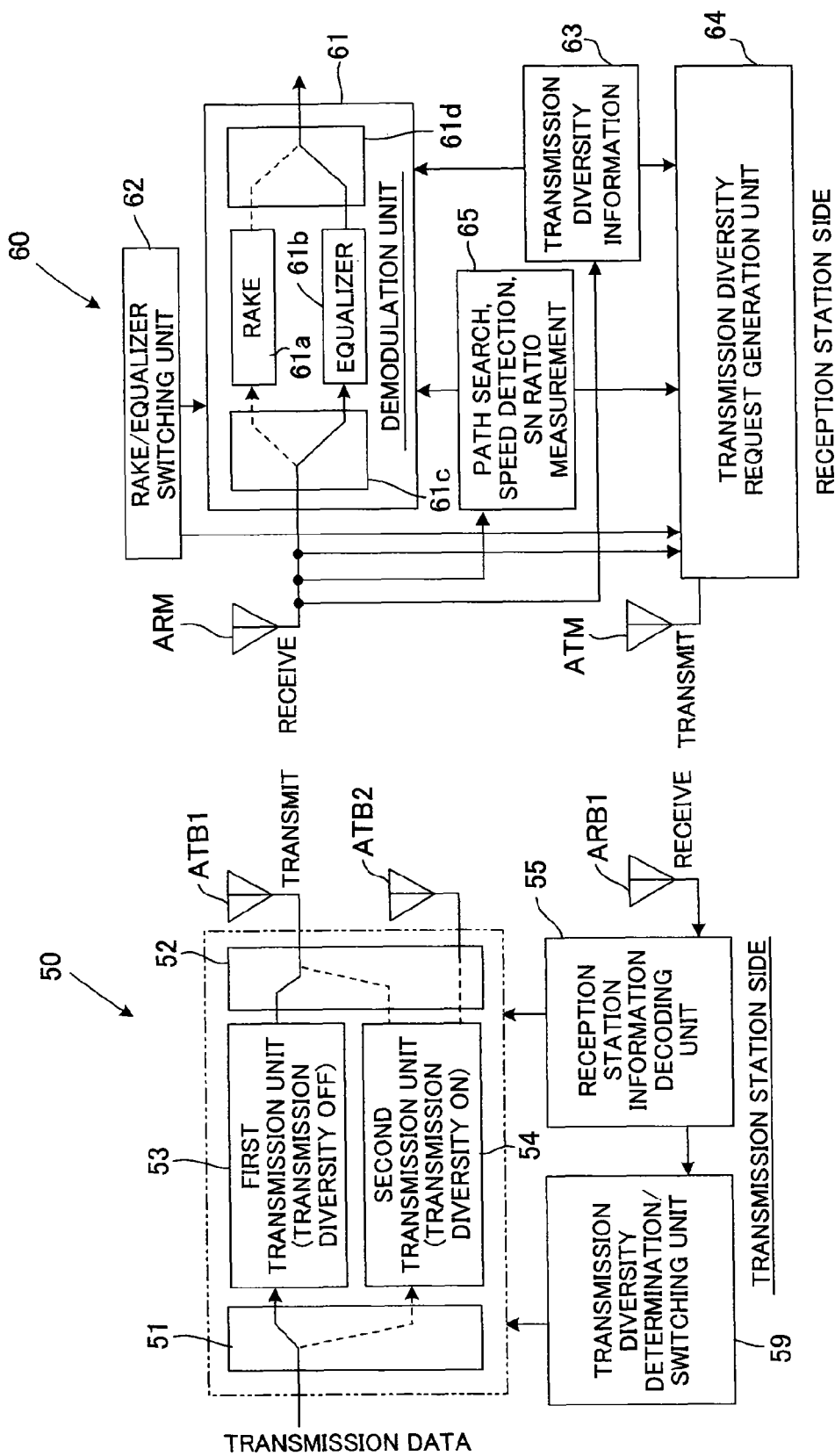
FIG. 16 is a block diagram showing a communication system according to a fifth embodiment.

A fifth embodiment relates to an example in which wasteful use of resources is avoided by entrusting the transmission station with the decision to perform transmission diversity control in a case where a reception SN ratio of the reception station is small such that an improvement in performance is unlikely to be achieved by switching transmission diversity ON and OFF. FIG. 16 is a block diagram showing an example of a communication system according to the fifth embodiment, in which identical reference symbols have been allocated to identical parts to the communication system of the first embodiment, shown in FIG. 3. The fifth embodiment differs from the first embodiment in that when a reception quality (SIR, SN ratio, and so on) is poor, wasteful use of resources is avoided by having the transmission diversity request generation unit 64 transmit a transmission diversity change request signal (report signal) to the transmission station, thereby entrusting the transmission station with transmission diversity ON/OFF decision, whereupon a transmission diversity switching unit 59 of the transmission station decides whether to start or stop the transmission diversity in relation to the corresponding reception station based upon the reception quality.

When the reception quality of the reception station is poor such that the reception performance does not change even when transmission diversity is switched ON or OFF, the transmission diversity control processing becomes ineffective, and moreover, the amount of power consumed by the processing increases. Therefore, the processing is paused for a fixed time period until the environment changes, and during the pause, transmission diversity ON/OFF control is entrusted to the transmission station side.

Figure 17:
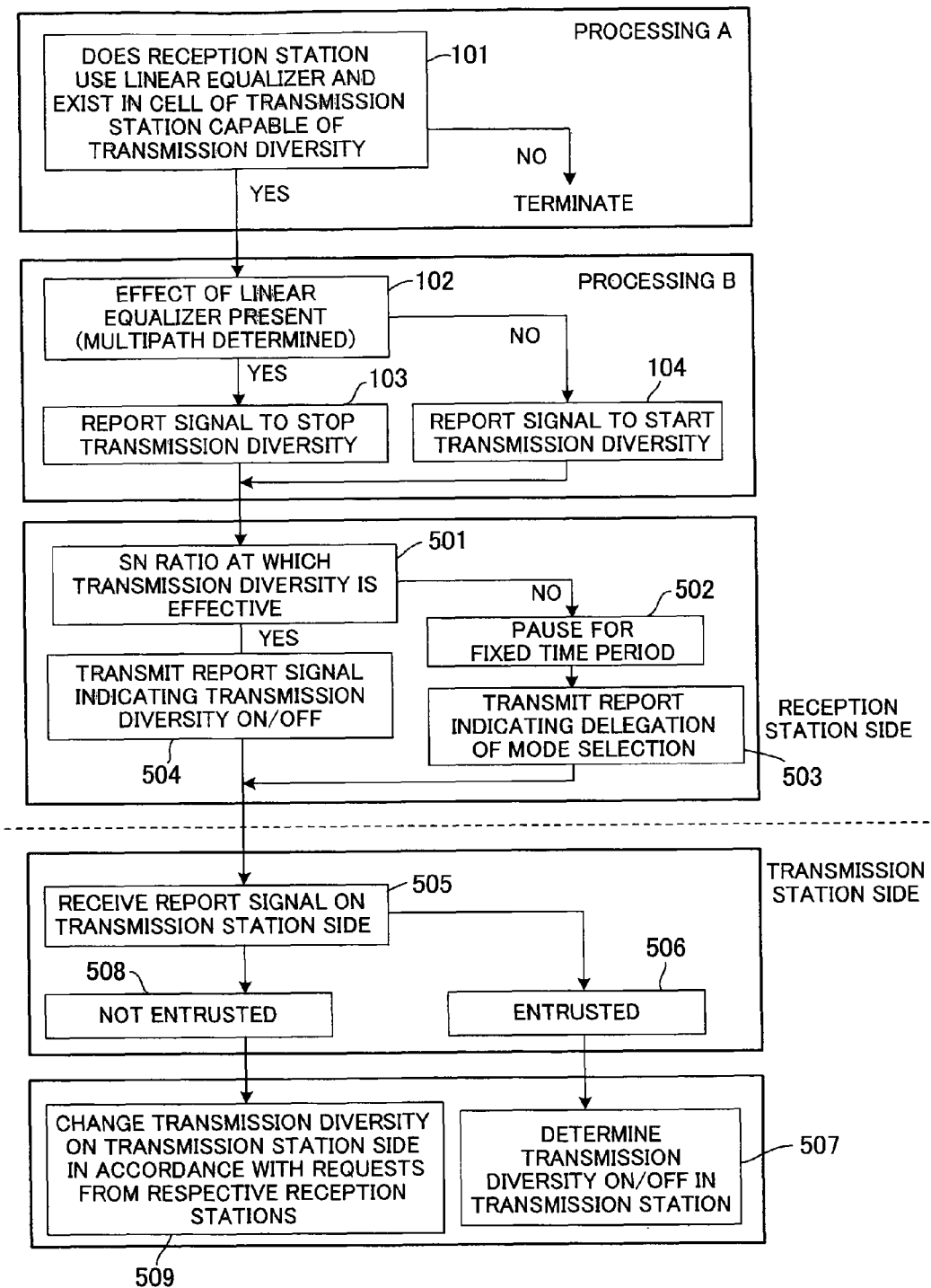
FIG. 17 shows an overall processing flow of the communication system according to the fifth embodiment.
Figure 18:
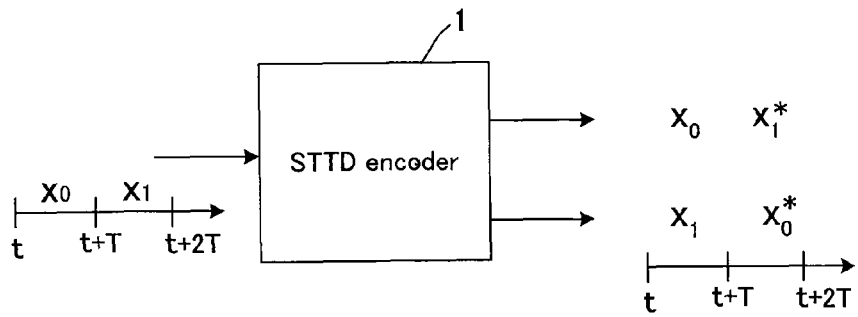
FIG. 18 is an illustrative view of an STTD encoder.
Figure 19:
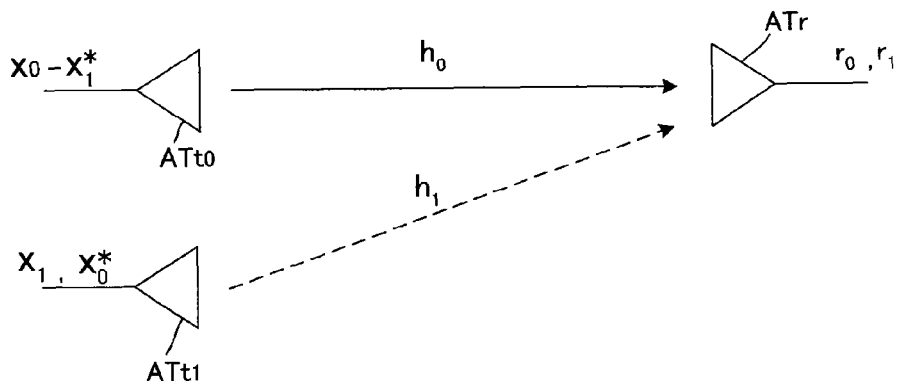
FIG. 19 is an illustrative view of an antenna arrangement in STTD.
Figure 20:
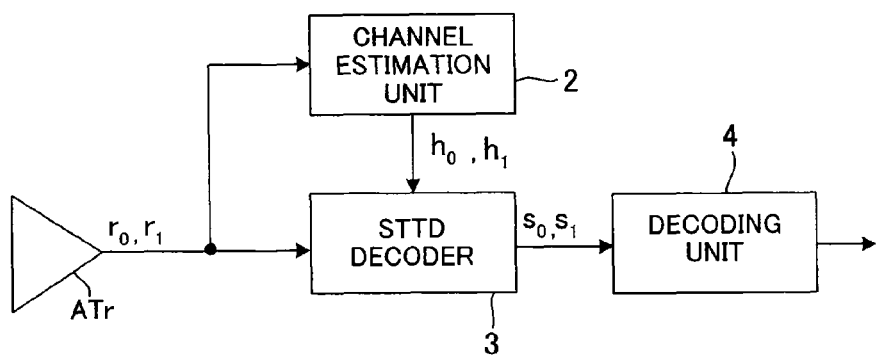
FIG. 20 is a block diagram showing an STTD reception unit.
Figure 21:
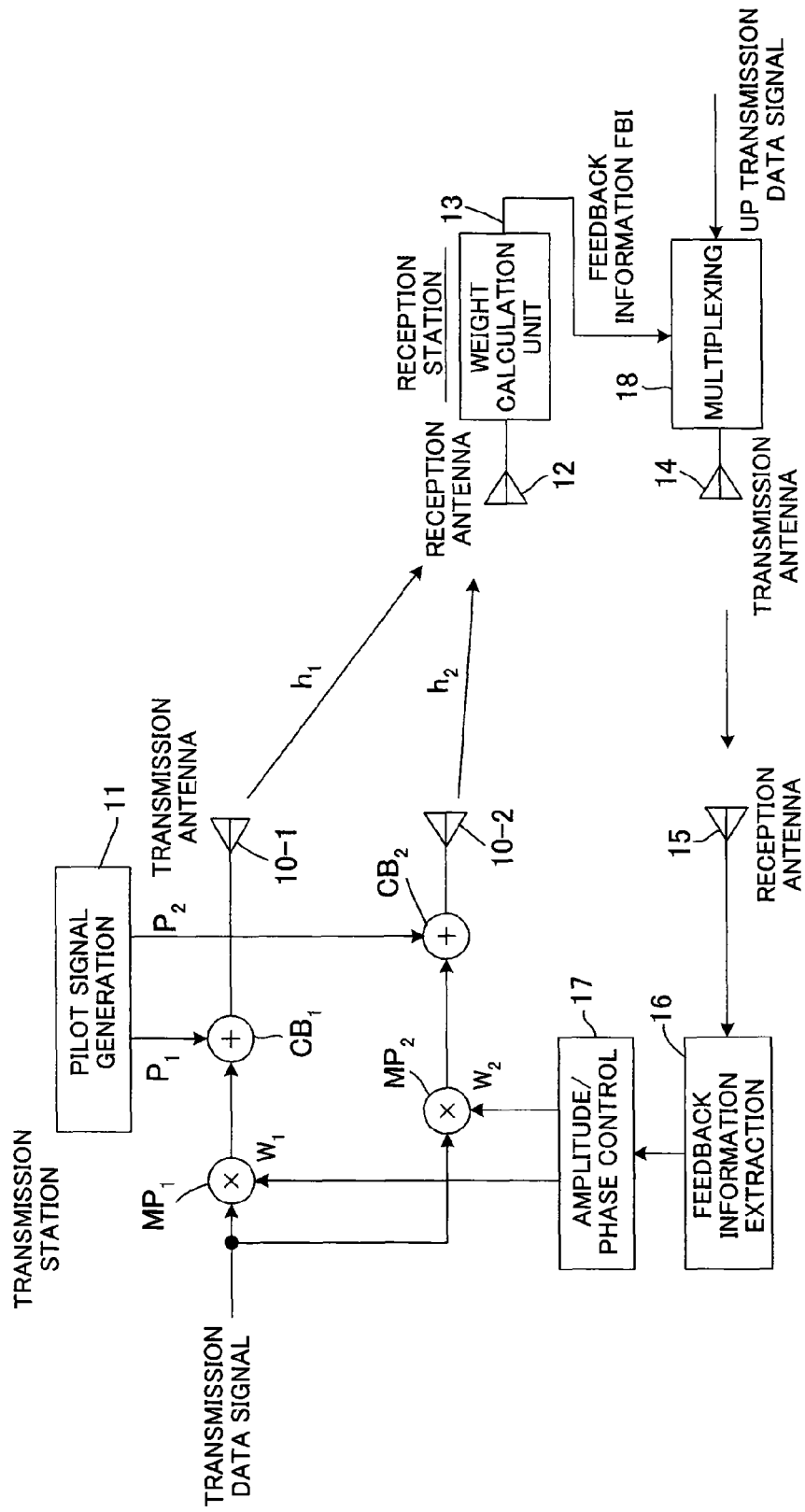
FIG. 21 is an illustrative view of a closed loop transmission diversity system.

FIG. 17 is a flowchart showing an overall processing flow of the communication system according to the fifth embodiment, in which Processing A and B is substantially identical to that of the first embodiment shown in FIG. 4. Checks are performed as to whether or not the reception station 60 uses an equalizer for demodulation and whether or not the reception station 60 exists in a cell of a transmission station which is capable of STTD transmission diversity (step 101). When the reception station 60 does not use the equalizer or does not exist in the cell of a transmission station which is capable of STTD transmission diversity, the processing is terminated.

When the reception station is using the linear equalizer and exists in the cell of a transmission station in which STTD transmission diversity is underway, a check is performed as to whether or not an effect has been generated by the linear equalizer 61b. In other words, a check is performed as to whether the number of paths found in the path search is substantially single or multiple (step 102).

When the number of paths is multiple, or in other words when the effect of the linear equalizer 61b is large, it is decided that STTD is to be switched OFF (step 103), and when the number of paths is substantially single, or in other words when the effect of the linear equalizer 61b is small, it is decided that STTD is to be switched ON (step 104).

Next, a determination is made as to whether or not the reception quality, for example the SN ratio, of the reception station is greater than a set value at which transmission diversity is effective (step 501). When the SN ratio is smaller than the set value such that transmission diversity is not effective, the transmission diversity ON/OFF decision processing is interrupted until the SN ratio increases beyond the set value in order to avoid wasteful use of resources (step 502). Further, the reception station send the transmission station a report signal that entrust the transmission station with the transmission diversity ON/OFF control (step 503).

On the other hand, when the SN ratio is larger than the set value at which transmission diversity is effective, the reception station transmits a report signal having information of the transmission diversity ON/OFF decided in the steps 103, 104, to the transmission station (step 504).

Having received the report signal from the reception station, the transmission station checks whether or not it has been entrusted with transmission diversity ON/OFF control (step 505). When the transmission station is entrusted with the transmission diversity ON/OFF control, the decision to switch transmission diversity ON or OFF is made in accordance with processing performed on the transmission station side, and transmission diversity control is performed on the basis of the decision (steps 506 to 507). On the other hand, when the transmission station is not entrusted with transmission diversity ON/OFF control and the information of the transmission diversity ON/OFF has been received from the reception station, the transmission station executes transmission diversity ON/OFF control on the basis of the transmission diversity ON/OFF decided in the reception station (step 508 to 509).

A case in which the transmission station performs STTD transmission diversity was described above, but similar control maybe performed when the transmission station performs closed loop transmission diversity CL. In this case, the transmission diversity request generation unit 64 creates and transmits a transmission diversity change request signal and the FBI bit information required for closed loop transmission diversity control.

Effects of the Invention

According to the present invention described above, when the effect of the equalizer is small, a request to start transmission diversity is issued to the transmission station, and when the effect of the equalizer is large, a request to stop transmission diversity is issued to the transmission station. Thus, transmission diversity in the transmission station can be started and stopped during an operation, thereby ensuring that a sufficient performance is extracted from the equalizer installed in the reception station.

According to the present invention, by having the reception station issue a request to the transmission station to start or stop transmission diversity control, the load on the transmission station can be lightened.

According to the present invention, transmission diversity can be started and stopped in relation to all channels at once by having the transmission station consider requests from the respective reception stations collectively. When transmission diversity is switched OFF in all channels, the precision of the correlation calculated by the equalizer improves, and therefore a further improvement in reception performance can be expected.

According to the present invention, when the SN ratio is small such that an improvement in performance is unlikely to be achieved by starting or stopping transmission diversity control, wasteful use of resources can be avoided by entrusting the transmission station with the decision to perform transmission diversity control. Moreover, by interrupting transmission diversity start/stop control in the reception station, the load on the reception station can be lightened.

What is claimed is:

1. A transmission diversity control method in which a request to start or stop transmission diversity is issued from a reception station to a transmission station having a transmission diversity function, comprising:

providing the reception station with an equalizer that reduces multipath interference on the basis of an inverse matrix of a T×T correlation matrix created by summing channel estimation value of each path which constitutes multipath and calculating correlation values between the sum of ith sampling timing and the sum of jth sampling timing where i=1, 2, . . . T and j=1, 2, . . . T;

issuing a transmission diversity start request to said transmission station when an effect generated by said equalizer is small; and issuing a transmission diversity stop request to said transmission station when the effect generated by said equalizer is large.

2. The transmission diversity control method according to claim 1, wherein in a case where said transmission diversity is realized by an open loop transmission diversity function, said transmission diversity start request is issued in a substantially single-path environment in which the effect generated by said equalizer is assumed to be small, and said transmission diversity stop request is issued in a multipath environment in which the effect generated by said equalizer is assumed to be large.

3. The transmission diversity control method according to claim 1, wherein in a case where said transmission diversity is realized by a closed loop transmission diversity function, when a reliability of a feedback signal transmitted to said transmission station from said reception station during said closed loop transmission diversity is high, then the effect generated by said equalizer is assumed to be small and said transmission diversity start request is issued, and when the reliability of said feedback signal is low, then the effect generated by said equalizer is assumed to be large and said transmission diversity stop request is issued to said transmission station.

4. The transmission diversity control method according to claim 3, wherein a speed of said reception station is measured, and when said measured speed is lower than a set speed, the reliability of said feedback signal is determined to be high.

5. The transmission diversity control method according to any of claims 1 to 3, wherein said reception station transmits, to said transmission station, information required by said transmission station to decide whether to start or stop said transmission diversity control, and said transmission station decides whether to start or stop said transmission diversity control on the basis of said information.

6. The transmission diversity control method according to any of claims 1 to 3, wherein said transmission station starts or stops said transmission diversity in relation to all channels at once by considering requests from respective reception stations collectively.

7. The transmission diversity control method according to any of claims 1 to 3, wherein when an SN ratio is small such that an improvement in performance is unlikely to be achieved by starting or stopping said transmission diversity control, said transmission station is entrusted with a decision to perform said transmission diversity control in order to avoid wasteful use of resources.

8. A reception station that issues a request to start or stop transmission diversity to a transmission station having a transmission diversity function, comprising:

an equalizer for reducing multipath interference on the basis of an inverse matrix of a T×T correlation matrix created by summing channel estimation value of each path which constitutes multipath and calculating correlation values between the sum of ith sampling timing and the sum of jth sampling timing where i=1, 2, ... T and j=1, 2, ... T;

an information gathering unit for gathering information required to determine whether an effect generated by said equalizer is large or small; and an information creation unit for creating information requesting said transmission station to start said transmission diversity when the effect generated by said equalizer is small, and creating information requesting said transmission station to stop said transmission diversity when the effect generated by said equalizer is large.

9. The reception station according to claim 8, wherein in a case where said transmission diversity is realized by an open loop transmission diversity function, said information gathering unit gathers information indicating whether or not said reception station exists in a multipath environment, and said information creation unit creates transmission diversity start request information when said reception station does not exist in the multipath environment and creates transmission diversity stop request information when said reception station exists in the multipath environment.

10. The reception station according to claim 8, wherein in a case where said transmission diversity is realized by a closed loop transmission diversity function, said information gathering unit gathers information indicating whether or not a reliability of a feedback signal is high, and said information creation unit creates transmission diversity start request information when the reliability of said feedback signal is high and creates transmission diversity stop request information when the reliability of said feedback signal is low.

11. A communication system in which a request to start or stop transmission diversity is issued from a reception station to a transmission station having a transmission diversity function, wherein said reception station comprises: an equalizer for reducing multipath interference on the basis of an inverse matrix of a T×T correlation matrix created by summing channel estimation value of each path which constitutes multipath and calculating correlation values between the sum of ith sampling timing and the sum of ith sampling timing where i=1, 2, ... T and i=1, 2, ... T; an information gathering unit for gathering information required to determine whether an effect generated by said equalizer is large or small; and an information creation unit for creating information requesting said transmission station to start said transmission diversity when the effect generated by said equalizer is small, and creating information requesting said transmission station to stop said transmission diversity when the effect generated by said equalizer is large, and said transmission station comprises: a first transmission unit for transmitting data without performing transmission diversity control; a second transmission unit for transmitting data after performing said transmission diversity control; and a control unit for performing control on the basis of said request from said reception station so that said data are transmitted without performing said transmission diversity control or transmitted after performing said transmission diversity control.

* * * * *